United States Patent
Takahashi et al.

(10) Patent No.: US 7,181,829 B2
(45) Date of Patent: Feb. 27, 2007

(54) METHOD OF MANUFACTURING A PERPENDICULAR MAGNETIC RECORDING HEAD

(75) Inventors: Toru Takahashi, Niigata-ken (JP);
Hisayuki Yazawa, Niigata-ken (JP);
Hideki Gochou, Niigata-ken (JP);
Kiyoshi Kobayashi, Niigata-ken (JP);
Minoru Yamada, Niigata-ken (JP);
Kiyoshi Sato, Niigata-ken (JP);
Toshinori Watanabe, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/222,441

(22) Filed: Sep. 8, 2005

(65) Prior Publication Data

US 2006/0002025 A1      Jan. 5, 2006

Related U.S. Application Data

(62) Division of application No. 10/435,414, filed on May 9, 2003, now Pat. No. 6,958,886, which is a division of application No. 10/025,131, filed on Dec. 18, 2001, now Pat. No. 6,687,084.

(30) Foreign Application Priority Data

Dec. 26, 2000  (JP) .............................. 2000-394697

(51) Int. Cl.
*G11B 5/127*       (2006.01)
*H04R 31/00*       (2006.01)

(52) U.S. Cl. ................. 29/603.15; 29/603.11; 29/603.13; 29/603.14; 29/603.16; 29/603.18; 360/123; 360/126; 360/317; 451/5; 451/41

(58) Field of Classification Search ............. 29/603.11, 29/603.13–603.16, 603.18, 606; 360/123, 360/126, 317; 451/5, 41

See application file for complete search history.

(56) References Cited

U.S. PATENT DOCUMENTS

| 4,546,398 A | 10/1985 | Toda et al. ................. 360/126 |
| 4,636,897 A | 1/1987 | Nakamura et al. .......... 360/119 |
| 4,855,854 A * | 8/1989 | Wada et al. ................. 360/126 |
| 4,873,599 A | 10/1989 | Sueoka ....................... 360/126 |
| 5,218,497 A | 6/1993 | Tanabe et al. .............. 360/315 |
| 5,463,518 A | 10/1995 | Otomo et al. ............... 505/171 |
| 5,742,998 A | 4/1998 | Jones, Jr. ................. 29/604.14 |
| 6,063,512 A * | 5/2000 | Osaka et al. ................ 428/812 |
| 6,101,067 A | 8/2000 | Matsuzono et al. ......... 360/317 |
| 6,259,583 B1 | 7/2001 | Fontana et al. ............. 360/126 |

(Continued)

FOREIGN PATENT DOCUMENTS

JP          01037703 A  *  2/1989

(Continued)

*Primary Examiner*—Paul D. Kim
(74) *Attorney, Agent, or Firm*—Brinks Hofer Gilson & Lione

(57) ABSTRACT

A main magnetic pole layer is formed on an insulating layer flattened into a high-flatness surface, and a yoke layer having a large film thickness is formed under the main magnetic pole layer independently of the main magnetic pole. The main magnetic pole layer has a front end surface formed in a shape with a width size gradually increasing in a direction of track width as the front end surface departs farther away from an auxiliary magnetic pole layer. A perpendicular magnetic recording head can be provided which can suppress the occurrence of fringing in a recording pattern, and can form the main magnetic pole layer with high pattern accuracy, and can satisfactorily introduce a recording magnetic field to a fore end of the main magnetic pole layer.

1 Claim, 20 Drawing Sheets

U.S. PATENT DOCUMENTS

| | | |
|---|---|---|
| 6,292,329 B1 | 9/2001 | Sato et al. ................. 360/126 |
| 6,297,938 B1 | 10/2001 | Niijima ..................... 360/317 |
| 6,339,872 B1 | 1/2002 | Chang et al. .......... 360/603.14 |
| 6,477,005 B1 | 11/2002 | Sasaki ....................... 360/126 |
| 6,477,008 B1 | 11/2002 | Change et al. ............. 360/128 |
| 6,480,355 B1 | 11/2002 | Kamijima ................... 360/126 |
| 6,513,228 B1 | 2/2003 | Khizroev et al. ........ 29/603.14 |
| 6,687,084 B2 | 2/2004 | Takahashi et al. .......... 360/126 |
| 6,693,768 B1 * | 2/2004 | Crue et al. ................. 360/126 |

FOREIGN PATENT DOCUMENTS

| | | |
|---|---|---|
| JP | 03017807 A | 1/1991 |
| JP | 04001924 A | 1/1992 |
| JP | 04017105 A | 1/1992 |
| JP | 04134610 A | 5/1992 |
| JP | 05174332 A | 7/1993 |
| JP | 8-106613 | 4/1996 |
| JP | 10-320720 | 12/1998 |

* cited by examiner

METHOD OF MANUFACTURING A PERPENDICULAR MAGNETIC RECORDING HEAD

This application is a divisional application of U.S. application Ser. No. 10/435,414, filed on May 9, 2003, now U.S. Pat. No. 6,958,886, which is a divisional application of U.S. application Ser. No. 10/025,131 filed on Dec. 18, 2001, now U.S. Pat. No. 6,687,084, issued on Feb. 3, 2004, entitled "PERPENDICULAR MAGNETIC RECORDING HEAD HAVING MAIN MAGNETIC POLE LAYER FORMED ON HIGH-FLATNESS SURFACE, AND METHOD OF MANUFACTURING THE HEAD", each of the above being incorporated herein by reference, and claims the benefit of priority to Japanese Patent Application 2000-394697, filed on Dec. 26, 2000.

BACKGROUND OF THE INVENTION

1. Field of the Invention

The present invention relates to a perpendicular magnetic recording head for recording data on a recording medium, such as a disk having a hard surface, under application of a perpendicular magnetic field. More particularly, the present invention relates to a perpendicular magnetic recording head and a method of manufacturing the head, which can suppress the occurrence of fringing in a recording pattern, can form a main magnetic pole layer with high pattern accuracy and form a yoke surface having a large film thickness, and can improve the passing efficiency of magnetic flux.

2. Description of the Related Art

Conventionally, a perpendicular magnetic recording method is utilized in a device for recording magnetic data on a recording medium, such as a disk, with a high density. FIG. 38 is a sectional view showing a general structure of a perpendicular magnetic recording head for use in the known perpendicular magnetic recording device.

As shown in FIG. 38, a perpendicular magnetic recording head H utilizing the perpendicular magnetic recording method is provided on a side end surface of a slider 1 moving or sliding in a floating relation over a recording medium. On a side end surface 1a of the slider 1, for example, the perpendicular magnetic recording head H is disposed between a nonmagnetic film 2 and a nonmagnetic coating film 3.

The perpendicular magnetic recording head H has an auxiliary magnetic pole layer 4 made of ferromagnetic materials, and a main magnetic pole layer 5 also made of ferromagnetic materials and formed above the auxiliary magnetic pole layer 4 with a space left between both the layers. An end surface 4a of the auxiliary magnetic pole layer 4 and an end surface 5a of the main magnetic pole layer 5 appear at an opposing surface Ha of the head positioned opposite to a recording medium M. The auxiliary magnetic pole layer 4 and the main magnetic pole layer 5 are magnetically coupled to each other in a magnetic coupling portion 6 located inward of the opposing surface Ha.

A nonmagnetic insulating layer 7 made of inorganic materials, such as Al₂O₃ and SiO₂, is positioned between the auxiliary magnetic pole layer 4 and the main magnetic pole layer 5. In the opposing surface Ha, an end surface 7a of the nonmagnetic insulating layer 7 appears between the end surface 4a of the auxiliary magnetic pole layer 4 and the end surface 5a of the main magnetic pole layer 5.

Then, a coil layer 8 made of conductive materials, e.g., Cu, is embedded in the nonmagnetic insulating layer 7.

Also, as shown in FIG. 38, the end surface 5a of the main magnetic pole layer 5 has a thickness hw smaller than a thickness hr of the end surface 4a of the auxiliary magnetic pole layer 4. A width size of the end surface 5a of the main magnetic pole layer 5 in the direction of track width (indicated by X in FIG. 38) defines a track width Tw that is much smaller than a width size of the end surface 4a of the auxiliary magnetic pole layer 4 in the direction of track width.

The recording medium M, on which magnetic data is to be recorded by the perpendicular magnetic recording head H, is moved in the Z-direction relative to the perpendicular magnetic recording head H. The recording medium M has a hard surface Ma on the outer surface side and a soft surface Mb on the inner side.

When a recording magnetic field is induced in both the auxiliary magnetic pole layer 4 and the main magnetic pole layer 5 upon energization of the coil layer 8, a leaked recording magnetic field passes between the end surface 4a of the auxiliary magnetic pole layer 4 and the end surface 5a of the main magnetic pole layer 5 while perpendicularly penetrating the hard surface Ma of the recording medium M and propagating in the soft surface Mb. Since the end surface 5a of the main magnetic pole layer 5 has an area much smaller than that of the end surface 4a of the auxiliary magnetic pole layer 4 as described above, magnetic flux Φ is concentrated on a portion of the recording medium opposing to the end surface 5a of the main magnetic pole layer 5. Thus, magnetic data is recorded in a portion of the hard surface Ma opposing to the end surface 5a with the concentrated magnetic flux Φ.

However, the conventional perpendicular magnetic recording head H, shown in FIG. 38, has the following problems.

(1) In the structure shown in FIG. 38, an upper surface of the nonmagnetic insulating layer 7 has a certain degree of roughness, and therefore the main magnetic pole layer 5 formed on the upper surface of the nonmagnetic insulating layer 7 has reduced pattern accuracy. On the other hand, it is particularly required not only to reduce the area of the end surface 5a of the main magnetic pole layer 5, which appears at the opposing surface Ha, so that the leaked recording magnetic field is highly concentrated, but also to narrow the track width Tw defined by the end surface 5a for achieving a high recording density on the recording medium M.

Accordingly, the structure shown in FIG. 38 causes a difficulty in forming the end surface 5a of the main magnetic pole layer 5 so as to provide a smaller track width Tw and hence a narrower track with high pattern accuracy. Thus, the conventional structure is not satisfactorily adaptable for a higher recording density.

(2) In order to introduce, to the opposing surface Ha, a magnetic field induced from the coil layer 8, an inward area of the main magnetic pole layer 5 is required to have a larger cross-sectional area through which the magnetic flux is allowed to pass. In the structure shown in FIG. 38, however, the main magnetic pole layer 5 is formed to extend rearward in the height direction (indicated by Y in FIG. 38) with a substantially constant film thickness, and the film thickness of the main magnetic pole layer 5 cannot be increased in the inward area thereof. Hence, the magnetic field induced from the coil layer 8 cannot be effectively introduced to a fore end of the main magnetic pole layer 5.

(3) Since the main magnetic pole layer 5 is formed as a single layer in the structure shown in FIG. 38, it is difficult to extremely reduce only the track width Tw defined by the end surface 5a of the main magnetic pole layer 5. Stated otherwise, the main magnetic pole layer 5 is formed by forming a holed pattern on a resist layer and then applying a magnetic material to the holed pattern by, e.g., plating. Such a process has a difficulty in extremely reducing the width size of the holed pattern only in a portion where the end surface 5a is to be formed.

(4) When the slider 1 is moved between an outer periphery and an inner periphery of the recording medium M in the form of a disk, the end surface 5a of the main magnetic pole layer 5 is sometimes inclined and causes a skew angle with respect to the tangential direction of rotation of the recording medium M (i.e., the Z-direction in FIG. 38). In the case of the end surface 5a of the main magnetic pole layer 5 being square or rectangular as shown in FIG. 39, if the end surface 5a of the main magnetic pole layer 5 has a skew angle with respect to the tangential direction of rotation of the recording medium (i.e., the Z-direction in FIG. 38), a lateral side 5b of the main magnetic pole layer 5 provides an inclined leaked magnetic field within a track width Tw1, as indicated by a broken line, whereby fringing F occurs and off-track characteristics deteriorate.

SUMMARY OF THE INVENTION

With the view of overcoming the above-mentioned problems in the related art, it is an object of the present invention to provide a perpendicular magnetic recording head and a method of manufacturing the head, which can form an end surface of a main magnetic pole layer with higher pattern accuracy, and which is adaptable for a narrower track.

Another object of the present invention is to provide a perpendicular magnetic recording head and a method of manufacturing the head, which can substantially increase an effective film thickness of the main magnetic pole layer in an inward area thereof, and which can more efficiently introduce magnetic flux, induced from a coil layer, to the end surface of the main magnetic pole layer.

Still another object of the present invention is to provide a perpendicular magnetic recording head and a method of manufacturing the head, which can suppress the occurrence of fringing in a recording pattern, and which can improve off-track characteristics.

To achieve the objects, the present invention provides a perpendicular magnetic recording head comprising an auxiliary magnetic pole layer, an insulating layer formed on the auxiliary magnetic pole layer, and a main magnetic pole layer formed on the insulating layer, wherein magnetic data is recorded on a recording medium by a perpendicular magnetic field concentrated on the main magnetic pole layer when a recording magnetic field is applied to the auxiliary magnetic pole layer and the main magnetic pole layer from a coil layer embedded in the insulating layer; the main magnetic pole layer is formed on a high-flatness surface and has a front end surface positioned in an opposing surface of the head opposite to the recording medium, the front end surface being formed in a shape with a width size gradually increasing in a direction of track width as the front end surface departs farther away from the auxiliary magnetic pole layer, the front end surface having an upper edge, of which width size in the direction of track width is defined at a track width Tw; and a yoke layer is formed in a larger film thickness than the main magnetic pole layer and has a cross-sectional area in a cross-section cut parallel to the opposing surface larger than an area of the front end surface of the main magnetic pole layer, the yoke layer having a front end surface positioned inward of the opposing surface and being magnetically coupled to the main magnetic pole layer.

With those features of the present invention, the main magnetic pole layer is formed on the insulating layer flattened into a high-flatness surface. Therefore, the main magnetic pole layer can be formed with high pattern accuracy. In particular, the front end surface of the main magnetic pole layer can be formed to be satisfactorily adapted for a narrower track.

Also, the front end surface of the main magnetic pole layer is formed in a shape with a width size gradually increasing in a direction of track width as the front end surface departs farther away from the auxiliary magnetic pole layer. It is therefore possible to satisfactorily prevent the occurrence of fringing in a recording pattern and to improve off-track characteristics.

Further, the yoke layer having a larger film thickness than the main magnetic pole layer is magnetically coupled to the main magnetic pole layer. It is therefore possible to effectively introduce magnetic flux from the yoke layer to the main magnetic pole layer, to increase the passing efficiency of the magnetic flux, and to improve overwrite characteristics.

The present invention can provide the perpendicular magnetic recording head having preferred structures as follows.

In one preferred structure of the present invention, a connecting layer rising from the auxiliary magnetic pole layer is formed inward of the opposing surface; the main magnetic pole layer is formed on the insulating layer flattened into a high-flatness surface, and the yoke layer is formed to lie on the main magnetic pole layer; and a base end portion of the main magnetic pole layer or a base end portion of the yoke layer is magnetically coupled to the connecting layer. That structure corresponds to FIG. 1.

In another preferred structure of the present invention, a second insulating layer is formed around the main magnetic pole layer, an upper surface of the second insulating layer and an upper surface of the main magnetic pole layer are formed on a same plane, and the yoke layer is formed on the same plane. That structure corresponds to FIGS. 11 and 12.

In the present invention, preferably, an upper surface of the main magnetic pole layer is covered by a third insulating layer except for the base end portion of the main magnetic pole layer, and the yoke layer is magnetically connected to the base end portion of the main magnetic pole layer. That structure corresponds to FIG. 5.

In still another preferred structure of the present invention, a connecting layer rising from the auxiliary magnetic pole layer is formed inward of the opposing surface; the main magnetic pole layer is formed on the insulating layer flattened into a high-flatness surface, and has a base end portion positioned nearer to the opposing surface than the connecting layer; and the yoke layer is also formed on the insulating layer and has a front end surface magnetically coupled to a rear end surface of the main magnetic pole layer, the yoke layer having a base end portion magnetically coupled to the connecting layer. That structure corresponds to FIG. 2.

In still another preferred structure of the present invention, a connecting layer rising from the auxiliary magnetic pole layer is formed inward of the opposing surface; the yoke layer is formed on the insulating layer flattened into a high-flatness surface and has a base end portion magnetically coupled to the connecting layer, and a fourth insulating layer is formed between the front end surface of the yoke layer and the opposing surface, an upper surface of the fourth insulating layer and an upper surface of the yoke layer being flattened flush with each other; and the main magnetic pole layer is formed to lie on the high-flatness upper surface of the yoke layer. That structure corresponds to FIGS. 3 and 4.

In still another preferred structure of the present invention, a connecting layer rising from the auxiliary magnetic pole layer is formed inward of the opposing surface, and a magnetic material layer is formed on the insulating layer flattened into a high-flatness surface, the magnetic material layer comprising a front area formed in a predetermined length to extend in a height direction from the opposing surface, and a rear area formed to extend rearward from a base end of the front area in the height direction, the rear area having a base end portion being magnetically coupled to the connecting layer; and the front area has a smaller film thickness than the rear area, the front area serving as the main magnetic pole layer, the rear area serving as the yoke layer. That structure corresponds to FIG. 6.

In the present invention, preferably, the front end surface of the yoke layer laid on or under the main magnetic pole layer is formed as a sloped or curved surface that is inclined in a height direction as the front end surface departs farther away from the main magnetic pole layer.

In the present invention, preferably, opposite lateral sides of the front end surface of the main magnetic pole layer in the direction of track width are formed as sloped or curved edges.

Further, the present invention provides a method of manufacturing a perpendicular magnetic recording head, the method comprising the steps of (a) forming an auxiliary magnetic pole layer of a magnetic material; (b) forming a connecting layer on the auxiliary magnetic pole layer at a position inward of an opposing surface of the head opposite to a recording medium, forming a coil layer on the auxiliary magnetic pole layer through an insulating undercoat layer over an area between the opposing surface and the connecting layer, and then filling an insulating layer on the coil layer; (c) polishing a surface of the insulating layer such that an upper surface of the insulating layer and an upper surface of the connecting layer are flattened flush with each other; (d) forming a resist layer on the insulating layer and the connecting layer, and forming in the resist layer a holed pattern having a hole space, of which inner width size in a direction of track width in at least the opposing surface gradually increases as the hole space departs farther away from the auxiliary magnetic pole layer; (e) forming a main magnetic pole layer in the holed pattern by plating, and removing the resist layer; and (f) forming a resist layer having a larger film thickness than the main magnetic pole layer to overlie from the main magnetic pole layer to the insulating layer, forming in the resist layer a holed pattern for a yoke layer, the holed pattern having a front end surface positioned inward of the opposing surface, the holed pattern being positioned on the main magnetic pole layer or on the insulating layer in an area extending from a rear end surface of the main magnetic pole layer in a height direction, forming the yoke layer in the holed pattern by plating, and then removing the resist layer.

With the manufacturing method set forth above, the perpendicular magnetic recording head shown in FIG. 1 or 2 can be manufactured.

In the manufacturing method of the present invention, the step (f) may be replaced by the steps of (g) forming a second insulating layer around the main magnetic pole layer, and flattening an upper surface of the insulating layer and an upper surface of the main magnetic pole layer to be flush with each other; and (h) forming a resist layer having a larger film thickness than the main magnetic pole layer to overlie from the main magnetic pole layer to the second insulating layer, forming in the resist layer a holed pattern for a yoke layer, the holed pattern having a front end surface positioned inward of the opposing surface, the holed pattern being positioned on the main magnetic pole layer and the second insulating layer, forming the yoke layer in the holed pattern by plating, and then removing the resist layer.

With the manufacturing method set forth above, the perpendicular magnetic recording head shown in FIGS. 11 and 12 can be manufactured.

In the manufacturing method of the present invention, the step (f) may be replaced by the steps of (i) forming a third insulating layer to overlie from the main magnetic pole layer to the insulating layer; (j) forming a hole in an area of the third insulating layer formed at least on a base end portion of the main magnetic pole layer; and (k) forming a resist layer having a larger film thickness than the main magnetic pole layer to lie on the third insulating layer, forming a holed pattern for a yoke layer in the resist layer, the holed pattern having a front end surface positioned inward of the opposing surface, forming the yoke layer in the holed pattern by plating, and then removing the resist layer.

With the manufacturing method set forth above, the perpendicular magnetic recording head shown in FIG. 5 can be manufactured.

In the manufacturing method of the present invention, the steps (d) to (f) are replaced by the steps of (l) forming a resist layer on the insulating layer, forming a holed pattern for a yoke layer in the resist layer, the holed pattern having a front end surface positioned inward of the opposing surface, forming the yoke layer in the holed pattern by plating, and then removing the resist layer; (m) forming a fourth insulating layer to lie on the yoke layer and the insulating layer, and polishing the fourth insulating layer such that an upper surface of the fourth insulating layer and an upper surface of the yoke layer are flattened flush with each other; and (n) forming a resist layer having a smaller film thickness than the yoke layer to lie on the yoke layer and the fourth insulating layer, and forming a holed pattern for the main magnetic pole layer to extend from an area of the resist layer on the fourth insulating layer, which is positioned on the side nearer to the opposing surface than a front end surface of the yoke layer, to an area of the resist layer on the yoke layer; and (o) forming the main magnetic pole layer in the holed pattern by plating, and then removing the resist layer.

With the manufacturing method set forth above, the perpendicular magnetic recording head shown in FIG. 3 or 4 can be manufactured.

In the manufacturing method of the present invention, the steps (d) to (f) are replaced by the steps of (p) forming a resist layer on the insulating layer and the connecting layer, and forming in the resist layer a holed pattern having a hole space, of which inner width size in a direction of track width in at least the opposing surface gradually increases as the hole space departs farther away from the auxiliary magnetic pole layer, the holed pattern having a base end portion formed to extend over the connecting layer; (q) forming a magnetic material layer in the holed pattern by plating, and then removing the resist layer; and (r) forming a resist layer on the magnetic material layer, forming in the resist layer a holed pattern through exposure and development processes, the holed pattern having a hole space positioned on the main magnetic material layer over a predetermined distance from the opposing surface in a height direction, and removing a part of the magnetic material layer, which is exposed through the hole space of the holed pattern, to have a reduced film thickness, the part of the magnetic material layer serving as the main magnetic pole layer, a remaining part of the magnetic material layer formed under the resist layer serving as the yoke layer.

With the manufacturing method set forth above, the perpendicular magnetic recording head shown in FIG. 6 can be manufactured.

DESCRIPTION OF THE PREFERRED EMBODIMENTS

Figure 1:
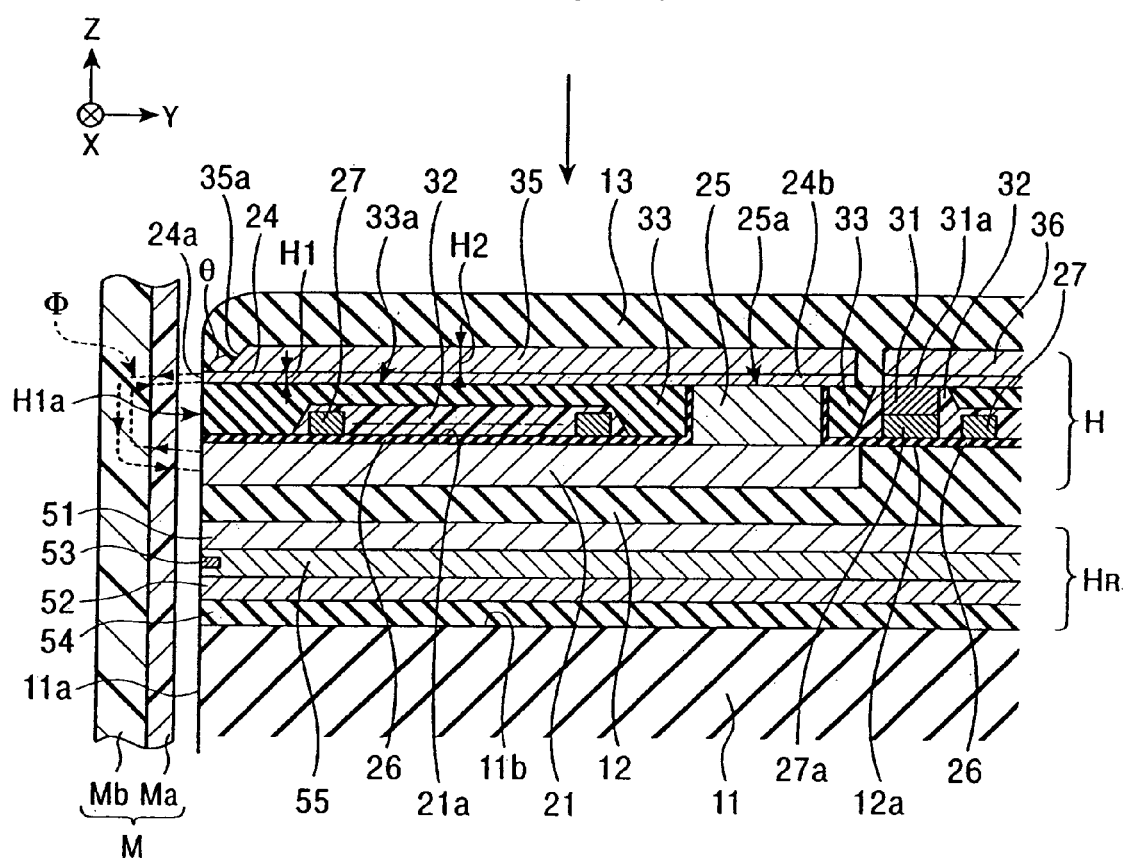
FIG. 1 is a vertical sectional view of a perpendicular magnetic recording head according to a first embodiment of the present invention.

FIG. 1 is a vertical sectional view showing a structure of a perpendicular magnetic recording head according to a first embodiment of the present invention.

In a perpendicular magnetic recording head H shown in FIG. 1, a perpendicular magnetic field is applied to a recording medium M for magnetizing a hard surface Ma of the recording medium M in the perpendicular direction.

The recording medium M is in the form of a disk, and has the hard surface Ma on its outer surface, which has high residual magnetization (remanence), and a high soft surface Mb on the inner side, which has a high magnetic permeability. The recording medium M is rotated with the disk center being the center of the rotation.

A slider 11 of the perpendicular magnetic recording head H is made of ceramic materials, such as $Al_2O_3$—TiC. The slider 11 has an opposing surface 11a positioned opposite to the recording medium M. When the recording medium M is rotated, the slider 11 floats from the surface of the recording medium M due to an air stream produced on the disk surface, or the slider 11 slides over the surface of the recording medium M. In FIG. 1, a direction in which the recording medium M is moved relative to the slider 11 is the Z-direction. The perpendicular magnetic recording head H is provided on a trailing-side end surface of the slider 11.

A nonmagnetic insulating layer 54 made of inorganic materials, such as $Al_2O_3$ and $SiO_2$, is formed on a side end surface 11b of the slider 11, and a reading portion HR is formed on the nonmagnetic insulating layer 54.

The reading portion HR comprises a lower shield layer 52, a gap layer 55, a magnetoresistive sensor 53, and an upper shield layer 51 formed in that order from the lowest side. The magnetoresistive sensor 53 is constituted by, for example, an anisotropic magnetoresistive (AMR) sensor, a giant magnetoresistive (GMR) sensor, or a tunnel type magnetoresistive (TMR) sensor.

A nonmagnetic insulating layer 12 made of inorganic materials, such as $Al_2O_3$ and $SiO_2$, is formed on the upper shield layer 51. The perpendicular magnetic recording head H of the present invention is provided on the nonmagnetic insulating layer 12. Then, a protective layer 13 made of, e.g., an inorganic nonmagnetic insulating layer is coated on the perpendicular magnetic recording head H. Also, the perpendicular magnetic recording head H has an opposing surface H1a, which is positioned opposite to the recording medium M and is substantially flush with the opposing surface 11a of the slider 11.

Further, in the perpendicular magnetic recording head H, an auxiliary magnetic pole layer 21 is formed to be embedded in the nonmagnetic insulating layer 12 by plating of ferromagnetic materials such as Permalloy (Ni—Fe). Stated otherwise, the nonmagnetic insulating layer 12 is formed under the auxiliary magnetic pole layer 21 and around the auxiliary magnetic pole layer 21 to horizontally encompass it from three directions. Then, as seen from FIG. 1, a surface (upper surface) 21a of the auxiliary magnetic pole layer 21 and a surface (upper surface) 12a of the nonmagnetic insulating layer 12 are positioned on the same plane.

As shown in FIG. 1, a connecting layer 25 made of Ni—Fe, for example, is formed on the surface 21a of the auxiliary magnetic pole layer 21 in an area spaced from the opposing surface H1a inward (in the height direction indicated by Y in FIG. 1).

Around the connecting layer 25, a nonmagnetic insulating layer 26 made of $Al_2O_3$, for example, is formed on the surface 21a of the auxiliary magnetic pole layer 21 and the surface 12a of the nonmagnetic insulating layer 12. A coil layer 27 made of conductive materials, such as Cu, is formed on the nonmagnetic insulating layer 26. The coil layer 27 is formed by frame plating, for example, such that it surrounds the connecting layer 25 in a spiral pattern with the predetermined number of windings. A raised layer 31 also made of conductive materials, such as Cu, is formed on a connection end 27a of the coil layer 27 at its winding center.

The coil layer 27 and the raised layer 31 are covered by double insulating layers; namely, it is covered by an insulating layer 32 made of organic materials, such as a resist material, and further covered by another insulating layer 33.

The insulating layer 33 is preferably made of inorganic insulating materials. Usable as the inorganic insulating material is at least one selected from among AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

A surface (upper surface) 25a of the connecting layer 25, a surface (upper surface) 31a of the raised layer 31, and a surface (upper surface) 33a of the insulating layer 33 are processed so as to lie on the same plane. The process of fattening those surfaces is performed by using, e.g., the CMP (Chemical Mechanical Polishing) technique that will be described later in connection with the manufacturing method.

In this first embodiment, a main magnetic pole layer 24 is formed on the insulating layer 33 and has a front end surface 24a positioned flush with the opposing surface H1a of the perpendicular magnetic recording head H. A base end portion 24b of the main magnetic pole layer 24 is formed on the upper surface 25a of the connecting layer 25 for magnetic coupling between them.

As shown in FIG. 1, a yoke layer 35 made of, e.g., a NiFe alloy is formed to lie on the main magnetic pole layer 24. The yoke layer 35 has a front end surface 35a, which locates at a position spaced from the opposing surface H1a inward in the height direction and is buried in the protective layer 13 so that it does not appear at the opposing surface H1a.

In this embodiment, the yoke layer 35 is formed to have a film thickness H2 larger than a film thickness H1 of the main magnetic pole layer 24.

Also, the front end surface 35a of the yoke layer 35 is formed as a sloped or curved surface inclined in the height direction (Y-direction in FIG. 1) as it approaches an upper surface from a lower surface of the yoke layer 35. An external angle θ formed between an upper surface of the main magnetic pole layer 24, on which the yoke layer 35 is formed, and the front end surface 35a of the yoke layer 35 is preferably not less than 90°. With that arrangement, the amount of a magnetic field leaked from the main magnetic pole layer 24 toward the yoke layer 35 can be reduced, and the magnetic field can be more efficiently concentrated to the main magnetic pole layer 24.

Further, as shown in FIG. 1, a lead layer 36 is formed on the surface 31a of the raised layer 31 so that a recording current can be supplied from the lead layer 36 to the raised layer 31 and the coil layer 27. The lead layer 36 can be made of the same material as that of the main magnetic pole layer 24 and the yoke layer 35. Also, the main magnetic pole layer 24, the yoke layer 35 and the lead layer 36 can be formed at the same time by plating. The yoke layer 35 and the lead layer 36 are covered by the protective layer 13.

Figure 10:
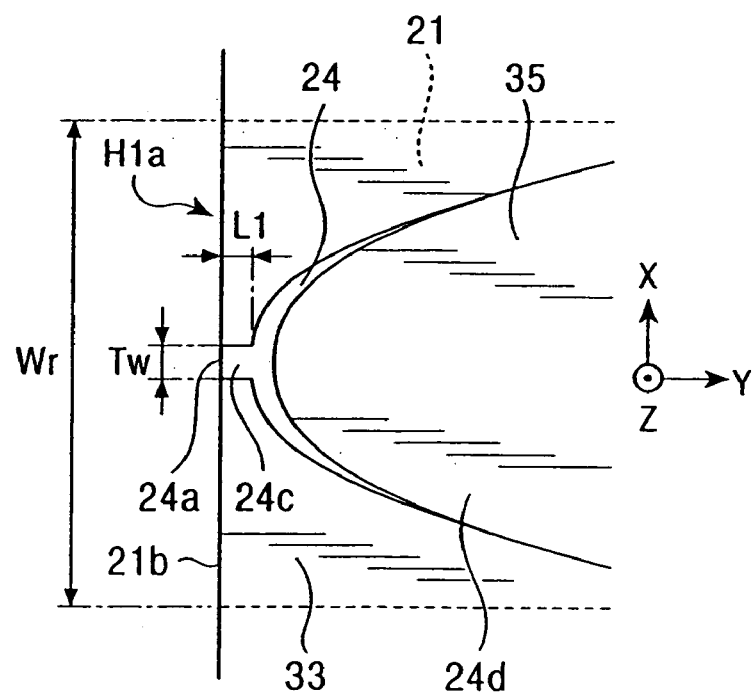
FIG. 10 is a plan view of the perpendicular magnetic recording head shown in FIG. 1.

FIG. 10 shows a plan view looking the perpendicular magnetic recording head H, shown in FIG. 1, from right above (in the direction indicated by arrow). As shown in the plan view of FIG. 10, the main magnetic pole layer 24 is formed such that an edge of the upper surface (trailing-side surface) of the main magnetic pole layer 24, which defines the front end surface 24a thereof, has a small width size corresponding to the track width Tw. Also, the main magnetic pole layer 24 has a front area 24c formed with a small width that is kept equal to the track width Tw or increases slightly larger than it. Further, a rear area 24d is formed to extend rearward from a base end of the front area 24c, and has a width size gradually increasing in the direction of track width.

As shown in FIG. 10, the yoke layer 35 is formed so as to lie on the rear area 24d of the main magnetic pole layer 24. The yoke layer 35 is formed to extend rearward in the height direction with a width size gradually increasing in the direction of track width.

In the present invention, the front end surface 24a of the main magnetic pole layer 24, which is exposed to the opposing surface H1a, is required to have an area larger than that of the front end surface 21b of the auxiliary magnetic pole layer 21. As shown in FIG. 10, for example, a width size Wr of the auxiliary magnetic pole layer 21 in the direction of track width is preferably formed to be much larger than the track width Tw.

Note that the configuration shown in FIG. 10 is given only by way of example, and the present invention is not limited to the illustrated configuration. In other words, it is just essential in the present invention that a cross-sectional area of the yoke layer 35 is larger than the area of the front end surface 24a of the main magnetic pole layer 24 in a certain cross-section of the yoke layer 35 cut parallel to the opposing surface H1a.

Also, in the structure shown in FIG. 10, the width size of the yoke layer 35 in the direction of track width X-direction in the drawing) is preferably equal to or smaller than that of the rear area 24d of the main magnetic pole layer 24 in the direction of track width. The reason is that because of the presence of a step between the main magnetic pole layer 24 and the insulating layer 33, if the yoke layer 35 is formed to jut out of the main magnetic pole layer 24 in the direction of track width, the pattern accuracy is reduced in the jutted portion and the yoke layer 35 cannot be satisfactorily formed in a predetermined shape.

Figure 11:
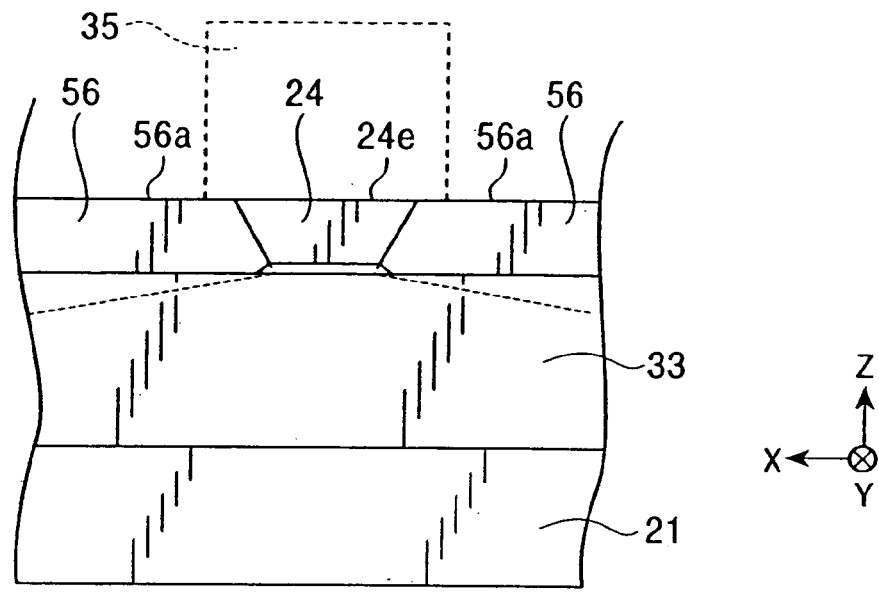
FIG. 11 is a partial front view showing a modification of the embodiment shown FIG. 1.
Figure 12:
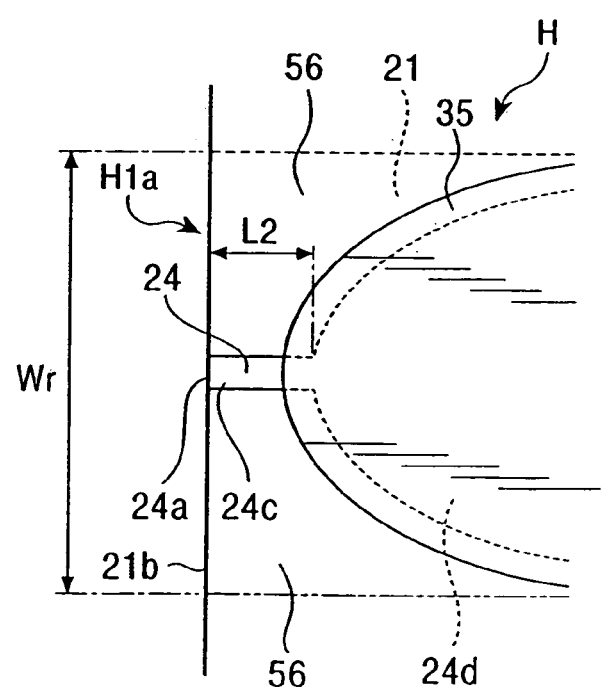
FIG. 12 is a plan view of the modification of FIG. 11.

Even in such a case, however, the yoke layer 35 may be formed to jut out of the main magnetic pole layer 24 in the direction of track width as shown in FIG. 12 (plan view). To realize that arrangement, as shown in FIG. 11 (front view), second insulating layers 56, 56 are additionally formed on both sides of the main magnetic pole layer 24 in the direction of track width (X-direction in the drawing). An upper surface 24e of the main magnetic pole layer 24 and upper surfaces 56a of the insulating layers 56 are polished so as to lie on the same plane by, e.g., the CMP technique. Then, the yoke layer 35 is formed on those polished surfaces. Since the upper surface 24e of the main magnetic pole layer 24 and the upper surfaces 56a of the insulating layers 56 are high-precisely flattened and leveled to be flush with each other in the above case, the yoke layer 35 can be formed on those upper surfaces 24a, 56a with high pattern accuracy.

The second insulating layers 56 are preferably made of inorganic insulating materials. Usable as the inorganic insulating material is at least one selected from among AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

While, in the embodiment shown in FIG. 1, the main magnetic pole layer 24 is formed to extend from the opposing surface H1a up to a position above the connecting layer 25, the main magnetic pole layer 24 may be formed in a shorter length, for example, such that its base end is located at a position closer to the opposing surface H1a than the connecting layer 25.

In such a case, the second insulating layer 56, shown in FIG. 11, is formed around the main magnetic pole layer 24, and the yoke layer 35 is formed on the second insulating layer 56. Then, a hole is formed in the second insulating layer 56 at a position above the connecting layer 25, and the yoke layer 35 is also formed in the hole by plating for magnetic coupling between the yoke layer 35 and the connecting layer 25.

Figure 2:
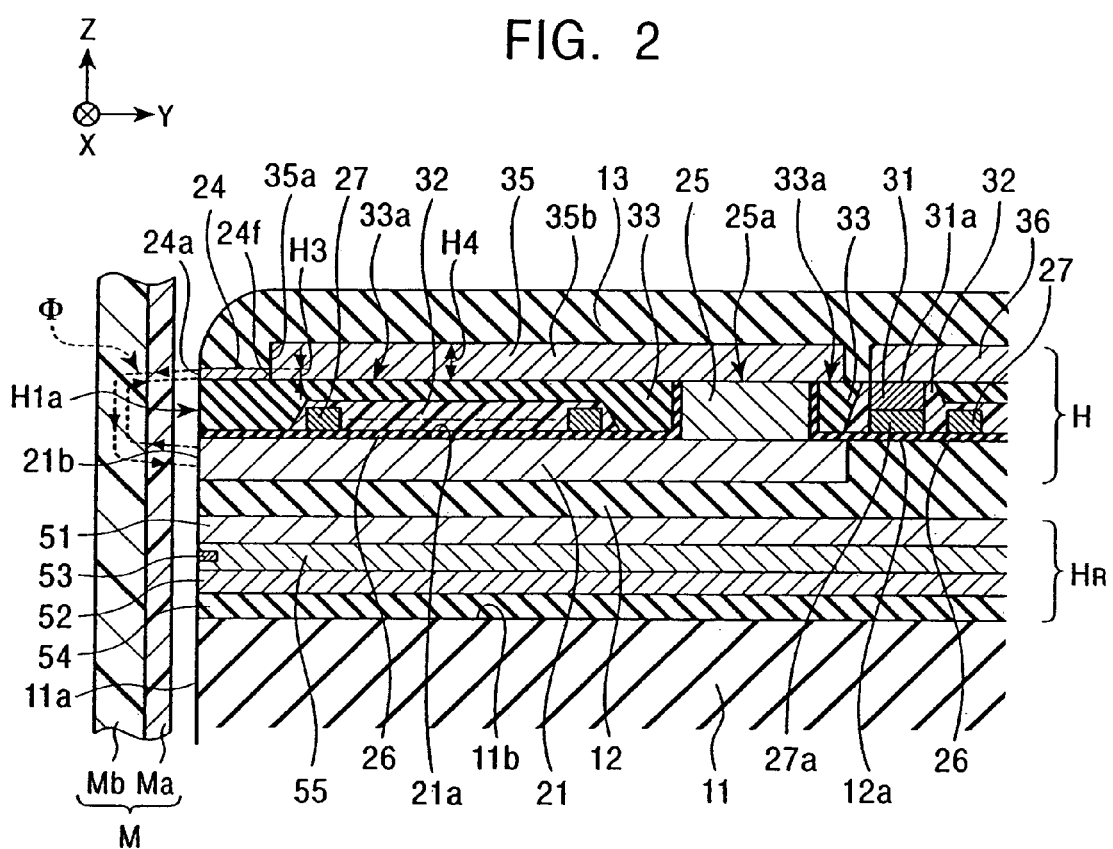
FIG. 2 is a vertical sectional view of a perpendicular magnetic recording head according to a second embodiment of the present invention.

FIG. 2 is a vertical sectional view showing a structure of a perpendicular magnetic recording head according to a second embodiment of the present invention.

The perpendicular magnetic recording head of FIG. 2 differs from that of FIG. 1 in structure of the main magnetic pole layer 24 and the yoke layer 35, although the yoke layer 35 is formed to have a film thickness H4 larger than a film thickness H3 of the main magnetic pole layer 24 as with the first embodiment. The main magnetic pole layer 24 is formed in a short length to extend from the opposing surface H1a in the height direction (Y-direction in FIG. 2). The yoke layer 35 has a front end surface 35a magnetically coupled to a rear end surface 24f of the main magnetic pole layer 24, and is formed on the insulating layer 33 to extend from the front end surface 35a rearward in the height direction. The yoke layer 35 has a base end portion 35b formed on the upper surface 25a of the connecting layer 25 for magnetic coupling between them.

Figure 13:
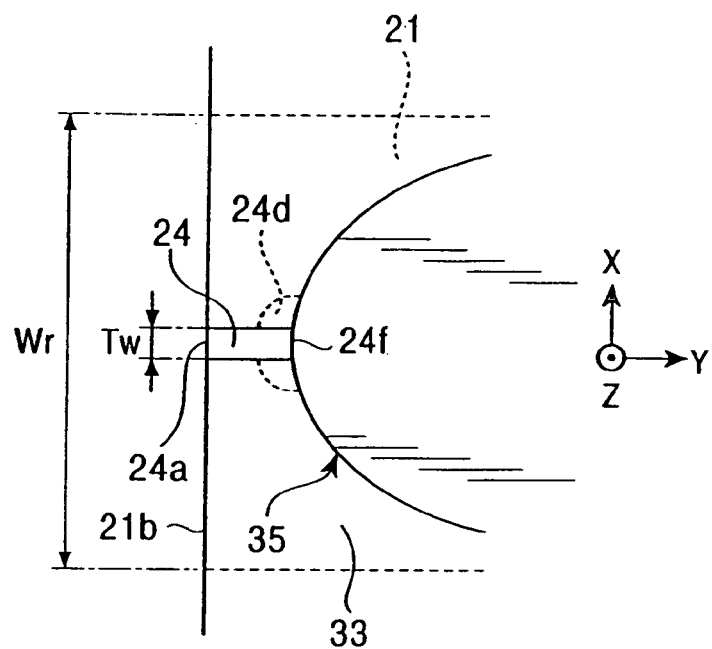
FIG. 13 is a plan view of the perpendicular magnetic recording head shown in FIG. 2.

FIG. 13 is a plan view of the perpendicular magnetic recording head shown in FIG. 2. As shown, the main magnetic pole layer 24 is formed such that an edge of the upper surface (trailing-side surface) of the main magnetic pole layer 24, which defines the front end surface 24a thereof, has a small width size corresponding to the track width Tw in the direction of track width (X-direction in the drawing). Then, the main magnetic pole layer 24 is formed to extend from the front end surface 24a rearward in the height direction (Y-direction in the drawing) with a small width that is kept equal to the track width Tw or increases slightly larger than it. Further, as shown in FIG. 13, the main magnetic pole layer 24 may have a rear area 24d with a width size gradually increasing in the direction of track width while it extends rearward in the height direction.

The yoke layer 35 is formed to extend rearward from the rear end surface 24f of the main magnetic pole layer 24 in the height direction with a width size gradually increasing in the direction of track width.

Note that the configuration shown in FIG. 13 is given only by way of example, and the present invention is not limited to the illustrated configuration. In other words, it is just essential in the present invention that a cross-sectional area of the yoke layer 35 is larger than the area of the front end surface 24a of the main magnetic pole layer 24 in a certain cross-section of the yoke layer 35 cut parallel to the opposing surface H1a.

Figure 3:
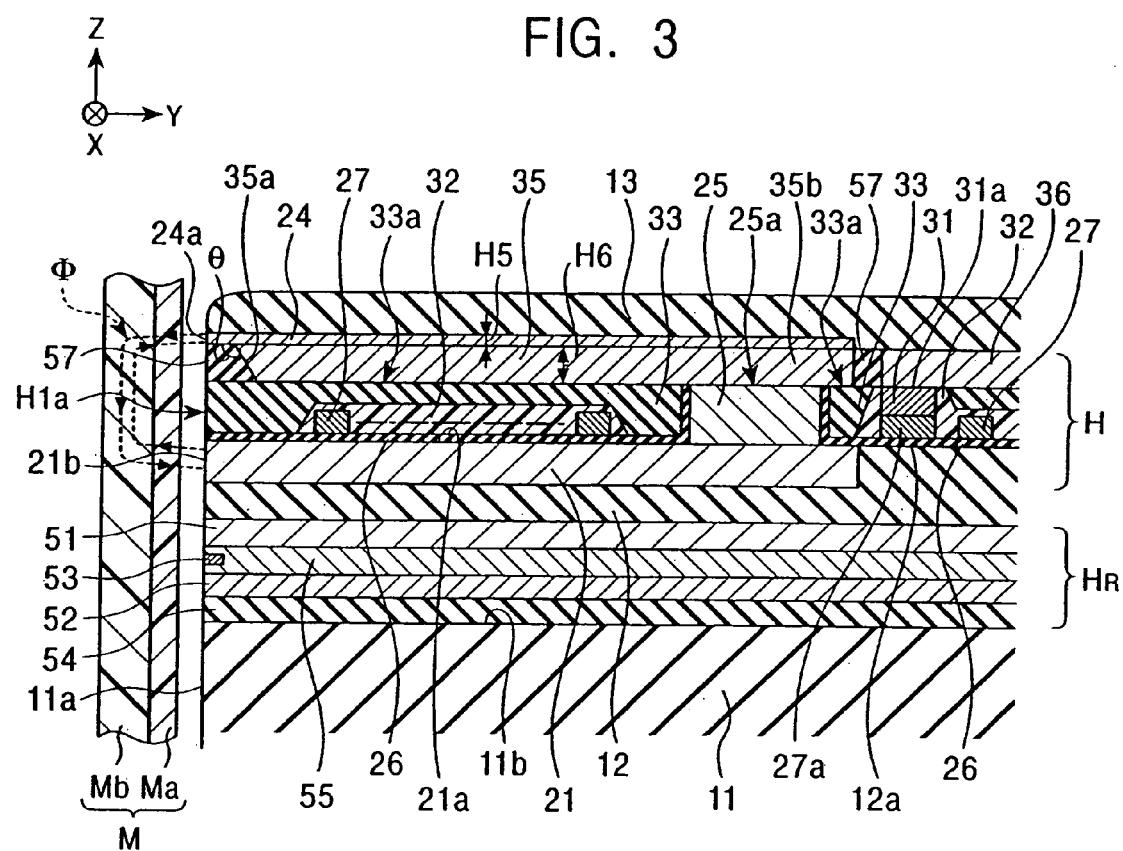
FIG. 3 is a vertical sectional view of a perpendicular magnetic recording head according to a third embodiment of the present invention.

FIG. 3 is a vertical sectional view showing a structure of a perpendicular magnetic recording head according to a third embodiment of the present invention.

The perpendicular magnetic recording head of FIG. 3 differs from that of FIG. 1 in structure of the main magnetic pole layer 24 and the yoke layer 35, although the yoke layer 35 is formed to have a film thickness H6 larger than a film thickness H5 of the main magnetic pole layer 24 as with the first embodiment. The yoke layer 35 is formed on the insulating layer 33 and has a base end portion 35b magnetically coupled to the upper surface 25a of the connecting layer 25.

Also, the yoke layer 35 has a front end surface 35a formed as a sloped or curved surface inclined toward the opposing surface H1a as it approaches an upper surface from a lower surface of the yoke layer 35. An external angle θ formed between a lower surface of the main magnetic pole layer 24, which is formed on the yoke layer 35, and the front end surface 35a of the yoke layer 35 is preferably not less than 90°. With that arrangement, the amount of a magnetic field leaked from the main magnetic pole layer 24 toward the yoke layer 35 can be reduced, and the magnetic field can be more efficiently concentrated to the main magnetic pole layer 24.

Further, as shown in FIG. 3, a space around the yoke layer 35 is filled with a fourth insulating layer 57. More specifically, as shown in FIG. 3, a space in front of the front end surface 35a of the yoke layer 35 is filled with the fourth insulating layer 57 until reaching the opposing layer H1a so that the fourth insulating layer 57 appears at the opposing layer H1a. In this embodiment, an upper surface of the fourth insulating layer 57 and an upper surface of the yoke layer 35 are high-precisely flattened and leveled to be flush with each other by using, e.g., the CMP technique.

The fourth insulating layer 57 is preferably made of inorganic insulating materials. Usable as the inorganic insulating material is at least one selected from among AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

Then, in this embodiment, the main magnetic pole layer 24 is formed to extend from the fourth insulating layer 57 to the yoke layer 35, which have been high-precisely flattened and leveled to be flush with each other.

Figure 14:
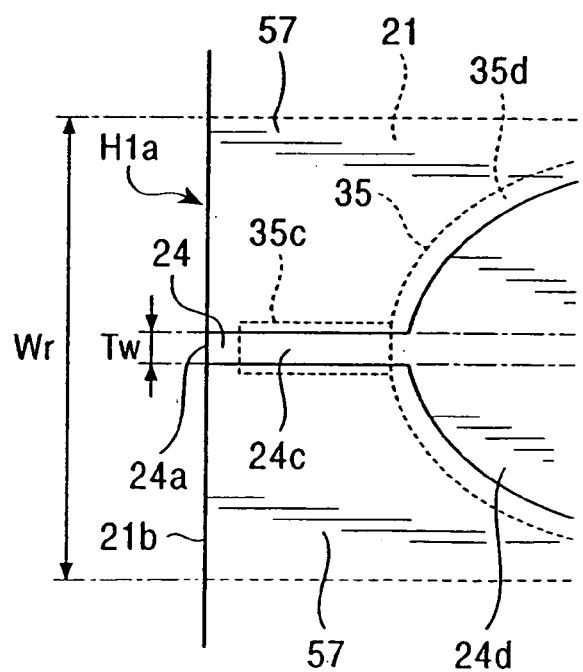
FIG. 14 is a plan view of the perpendicular magnetic recording head shown in FIG. 3.

FIG. 14 is a plan view of the perpendicular magnetic recording head shown in FIG. 3. As shown in FIG. 14, the yoke layer 35 comprises two planar areas, i.e., a thin front area 35c having a small width in the direction of track width, and a rear area 35d formed to extend from a rear end of the thin front area 24c rearward in the height direction with a width size gradually increasing in the direction of track width.

Additionally, the yoke layer 35 is formed such that the width size of the front area 35c in the direction of track is larger than the track width Tw.

As shown in FIG. 14, the main magnetic pole layer 24 is formed to extend from the fourth insulating layer 57 to the yoke layer 35 such that the front end surface 24f of the main magnetic pole layer 24 appears at the opposing surface H1a and an upper edge of the front end surface 24a of the main magnetic pole layer 24 has a small width size corresponding to the track width Tw. Further, the main magnetic pole layer 24 comprises two planar areas, i.e., a front area 24c formed to extend from the front end surface 24a rearward in the height direction with a small width that is equal to the track width Tw or is slightly larger than it, and a rear area 24d formed to extend from the front area 24c rearward in the height direction with a width size gradually increasing in the direction of track width.

Note that the configuration shown in FIG. 14 is given only by way of example, and the present invention is not limited to the illustrated configuration. In other words, it is just essential in the present invention that a cross-sectional area of the yoke layer 35 is larger than the area of the front end surface 24a of the main magnetic pole layer 24 in a certain cross-section of the yoke layer 35 cut parallel to the opposing surface H1a.

For example, the thin front area 35c is not necessarily required, and the yoke layer 35 may be formed by only the rear area 35d. Also, the thin front area 24c of the main magnetic pole layer 24 may be further extended rearward, as indicated by one-dot-chain lines, without forming the rear area 24d that has a width size gradually increasing in the direction of track width.

Figure 4:
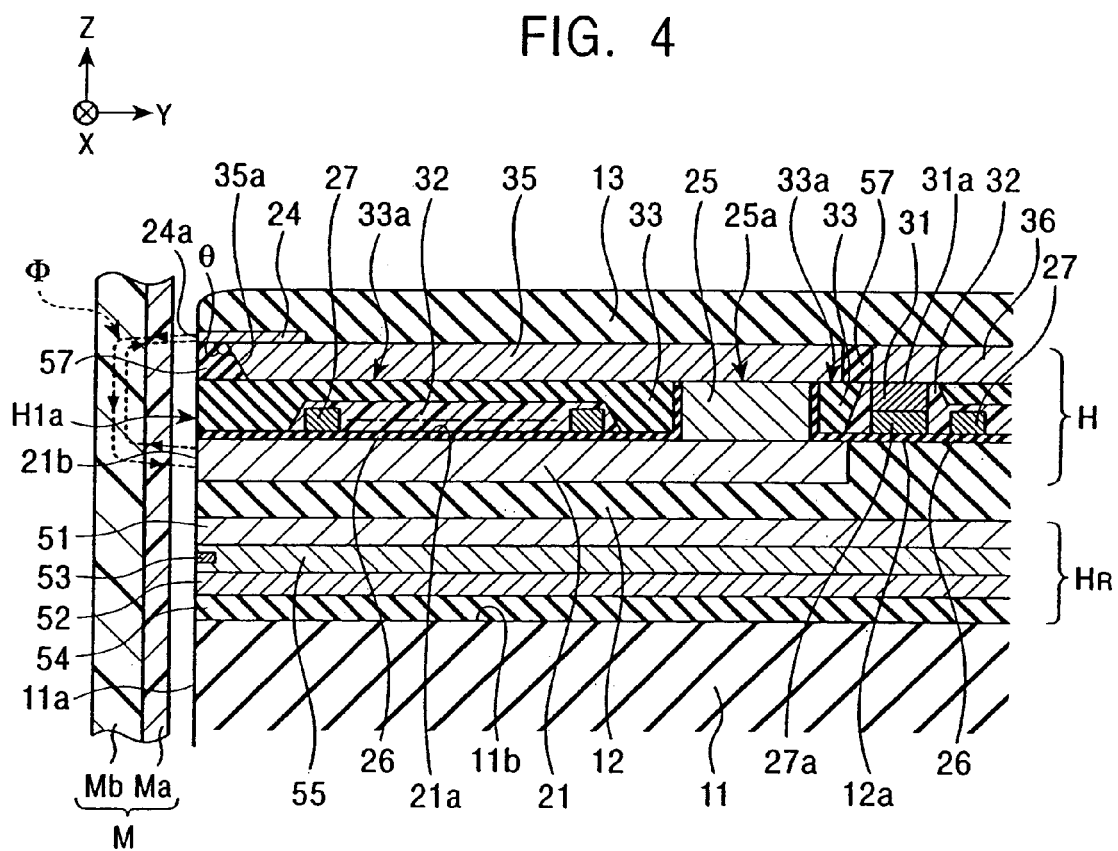
FIG. 4 is a vertical sectional view of a perpendicular magnetic recording head according to a fourth embodiment of the present invention.

FIG. 4 is a vertical sectional view showing a structure of a perpendicular magnetic recording head according to a fourth embodiment of the present invention.

The perpendicular magnetic recording head of FIG. 4 differs from that of FIG. 3 only in that the main magnetic pole layer 24 is formed in a short length to extend rearward from the opposing surface H1a in the height direction.

Figure 15:
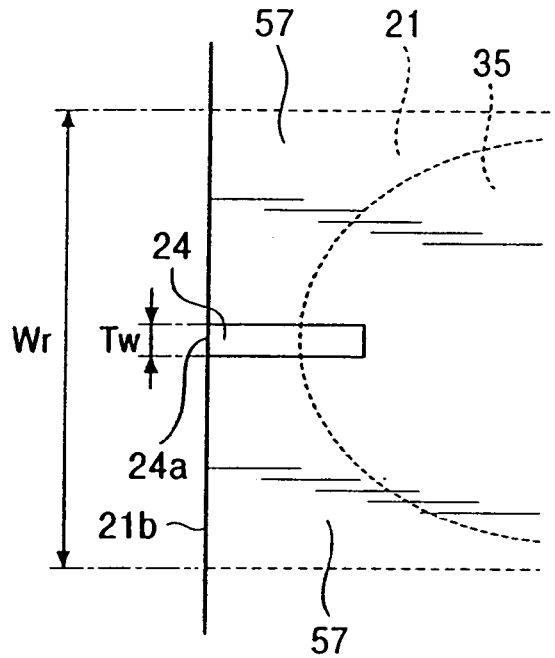
FIG. 15 is a plan view of the perpendicular magnetic recording head shown in FIG. 4.

FIG. 15 is a plan view of the perpendicular magnetic recording head shown in FIG. 4. As shown in FIG. 15, the main magnetic pole layer 24 is formed in a short length to extend from the upper surface of the fourth insulating layer 57 to the upper surface of the yoke layer 35, those upper surfaces of both the layers 24, 57 being high-precisely flattened and leveled to be flush with each other. Further, the main magnetic pole layer 24 is formed such that an upper edge of the front end surface 24a of the main magnetic pole layer 24 has a small width size corresponding to the track width Tw in the direction of track width, and the main magnetic pole layer 24 is extended from the front end surface 24a rearward in the height direction with a small width that is kept equal to the track width Tw or increases slightly larger than it. Although the yoke layer 35 shown in FIG. 15 does not include the thin front area 35c formed in the structure of FIG. 14, it may also be formed in the structure of FIG. 15. The yoke layer 35 in FIG. 15 is formed in a shape with a width size gradually increasing in the direction of track width.

Figure 16:
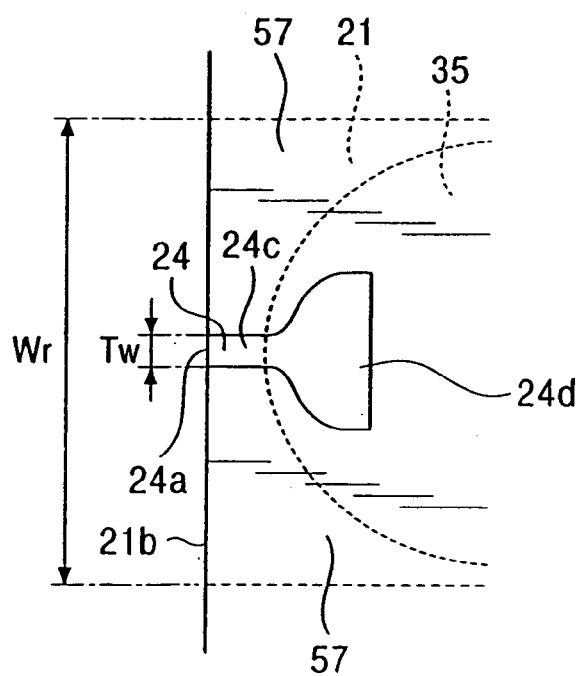
FIG. 16 is a plan view of a modification of the perpendicular magnetic recording head shown in FIG. 4.

FIG. 16 is a plan view of a modification of the perpendicular magnetic recording head shown in FIG. 4. The structure of this modification differs from that of FIG. 15 in that the main magnetic pole layer 24 comprises a thin front area 24c having a small width and a rear area 24d extended from a base end of the front area 24c rearward in the height direction while gradually increasing in the direction of track width. With such an arrangement, magnetic flux can be more satisfactorily introduced from the yoke layer 35 to the main magnetic pole layer 24, and a perpendicular magnetic recording head capable of effectively achieving a higher recording density can be manufactured.

Note that the configurations shown in FIGS. 15 and 16 are given only by way of example, and the present invention is not limited to the illustrated configurations. In other words, it is just essential in the present invention that a cross-sectional area of the yoke layer 35 is larger than the area of the front end surface 24a of the main magnetic pole-layer 24 in a certain cross-section of the yoke layer 35 cut parallel to the opposing surface H1a.

Figure 5:
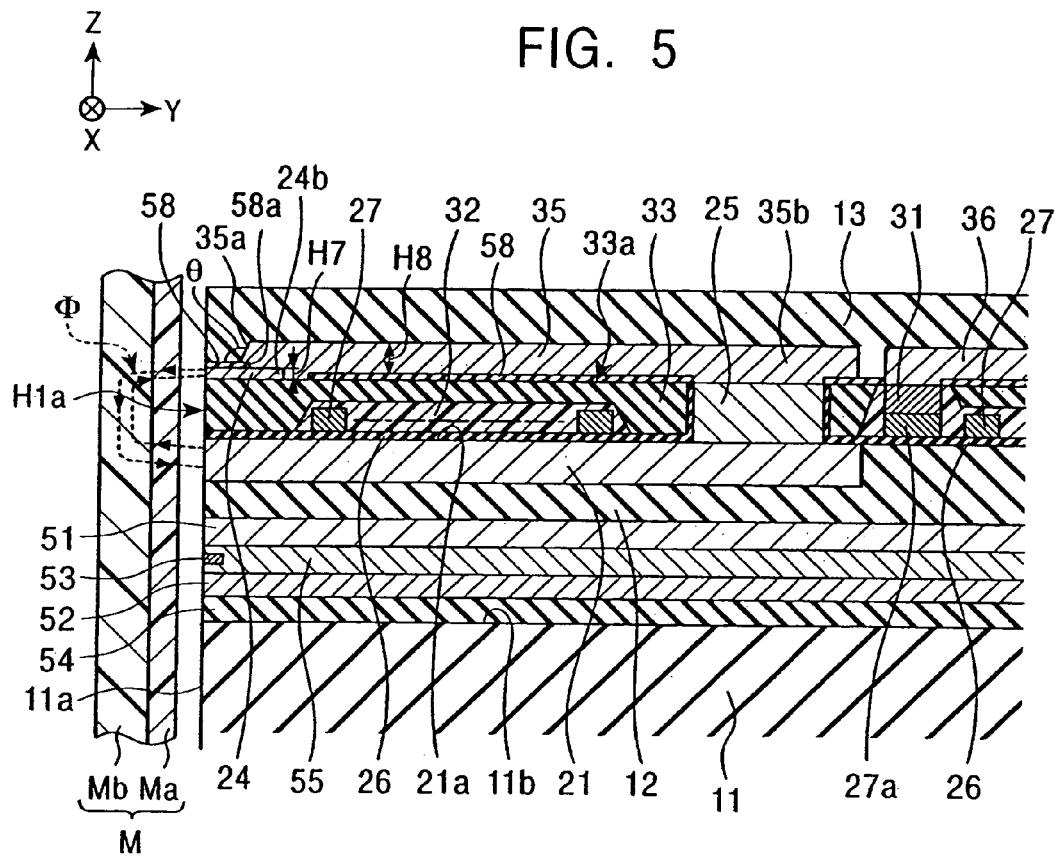
FIG. 5 is a vertical sectional view of a perpendicular magnetic recording head according to a fifth embodiment of the present invention.

FIG. 5 is a vertical sectional view showing a structure of a perpendicular magnetic recording head according to a fifth embodiment of the present invention.

The perpendicular magnetic recording head of FIG. 5 differs from that of FIG. 1 in structure of the main magnetic pole layer 24 and the yoke layer 35

In the structure of FIG. 5, the yoke layer 35 is formed to have a film thickness H8 larger than a film thickness H7 of the main magnetic pole layer 24 as with the first embodiment. However, the main magnetic pole layer 24 is formed in a short length on the upper surface 33a of the insulating layer 33 to extend rearward from the opposing surface H1a in the height direction (Y-direction in the drawing). Further, a third insulating layer 58 is formed to lie on the insulating layer 33 and extend rearward from a position somewhat spaced from a rear end surface of the main magnetic pole layer 24 in the height direction. The third insulating layer 58 is not formed on the connecting layer 25 and the raised layer 31.

The third insulating layer 58 is preferably made of inorganic insulating materials. Usable as the inorganic insulating material is at least one selected from among AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

Also, a part of the third insulating layer 58 is formed on the main magnetic pole layer 24, but it is not formed on a base end portion 24b of the main magnetic pole layer 24. The third insulating layer 58 formed on the main magnetic pole layer 24 serves, as described later in connection with the manufacturing method, to protect the main magnetic pole layer 24 against etching that is performed for removing an undercoat layer formed around the yoke layer 33.

The yoke layer 35 is formed on the third insulating layer 58 that is spaced rearward from the main magnetic pole layer 24 in the height direction. A front portion of the yoke layer 35 is located on the base end portion 24b of the main magnetic pole layer 24, which is exposed through a hole 58a formed in the third insulating layer 58, for magnetic coupling between the yoke layer 35 and the main magnetic pole layer 24.

The yoke layer 35 has a front end surface 35a positioned inward of the opposing surface H1a, and a space defined in front of the front end surface 35a on the side of the opposing surface H1a is filled with the protective layer 13. Also, as shown in FIG. 5, the front end surface 35a of the yoke layer 35 is preferably formed as a sloped or curved surface inclined in the height direction as it approaches an upper surface from a lower surface of the yoke layer 35, for the purpose of suppressing a leak of the magnetic field from the main magnetic pole layer 24 to the yoke layer 35.

An external angle θ formed between the front end surface 35a and the lower surface of the yoke layer 35 (upper surface of the third insulating layer 58) is preferably not less than 90°.

A base end portion 35b of the yoke layer 35 is formed to lie on the connecting layer 25 for magnetic coupling between them.

Further, a lead layer 36 formed in the same step as that of forming the yoke layer 35 is formed on the raised layer 31.

Figure 17:
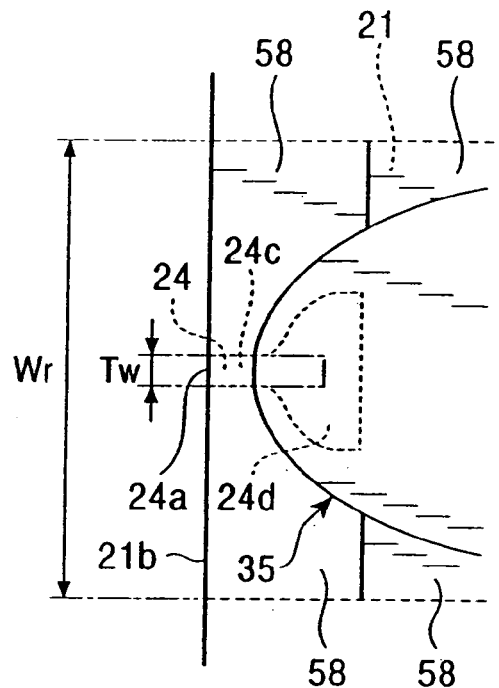
FIG. 17 is a plan view of the perpendicular magnetic recording head shown in FIG. 5.

FIG. 17 is a plan view of the perpendicular magnetic recording head shown in FIG. 5. As shown in FIG. 17, the main magnetic pole layer 24 is formed such that an upper edge of the front end surface 24a of the main magnetic pole layer 24 has a small width size corresponding to the track width Tw. Further, the main magnetic pole layer 24 comprises a front area 24c formed to extend from the front end surface 24a rearward in the height direction with a small width that is kept equal to the track width Tw or increases slightly larger than it, and a rear area 24d formed to extend from a base end of the front area 24c rearward in the height direction with a width size gradually increasing in the direction of track width. Alternatively, the main magnetic pole layer 24 may be formed just by simply extending the front area 24c with a small width that is kept equal to the track width Tw or increases slightly larger than it, as indicated by one-dot-chain lines.

In addition, as shown in FIG. 17, the yoke layer 35 magnetically coupled to the base end portion 24b of the main magnetic pole layer 24 is formed in a shape with a width size gradually increasing in the direction of track width while it is extended rearward in the height direction. Such a thin front area as indicated by 35c shown in FIG. 14 may be formed to extend from a front end of the yoke layer 35 toward the side of the opposing surface H1a.

Note that the configuration shown in FIG. 17 is given only by way of example, and the present invention is not limited to the illustrated configuration. In other words, it is just essential in the present invention that a cross-sectional area of the yoke layer 35 is larger than the area of the front end surface 24a of the main magnetic pole layer 24 in a certain cross-section of the yoke layer 35 cut parallel to the opposing surface H1a.

Figure 6:
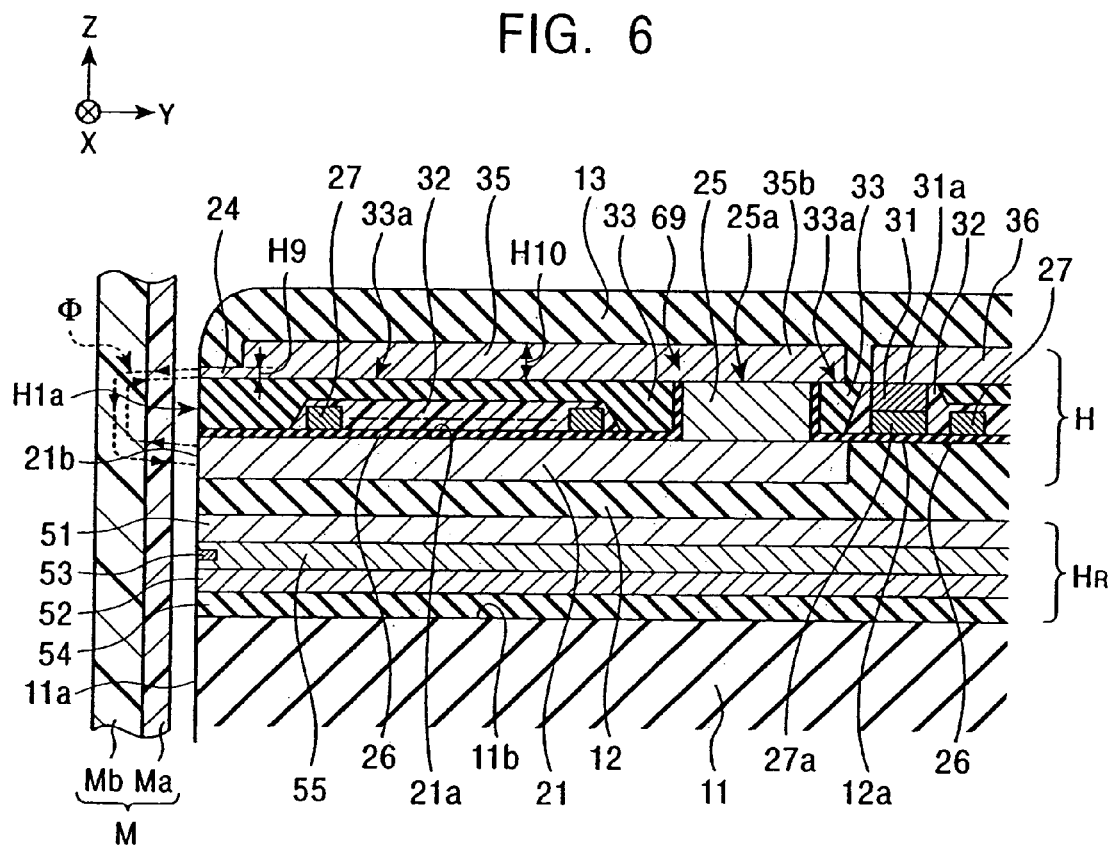
FIG. 6 is a vertical sectional view of a perpendicular magnetic recording head according to a sixth embodiment of the present invention.

FIG. 6 is a vertical sectional view showing a structure of a perpendicular magnetic recording head according to a sixth embodiment of the present invention.

The perpendicular magnetic recording head of FIG. 6 differs from that of FIG. 1 in structure of the main magnetic pole layer 24 and the yoke layer 35. In FIG. 6, a magnetic material layer 69 including a section of the main magnetic pole layer 24 and a section of the yoke layer 35, which are constituted as an integral structure, is formed on the insulating layer 33. As seen from FIG. 6, the magnetic material layer 69 is made up of the main magnetic pole layer 24 covering a front area extended in a predetermined length rearward from the opposing surface H1a in the height direction, and the yoke layer 35 covering a rear area extended rearward from a base end of the front area in the height direction. A base end portion 35b of the rear area serving as the yoke layer 35 is formed on the upper surface 25a of the connecting layer 25 for magnetic coupling between them.

Also in this embodiment, as shown in FIG. 6, the yoke layer 35 is formed to have a film thickness H10 larger than a film thickness H9 of the main magnetic pole layer 24.

Figure 18:
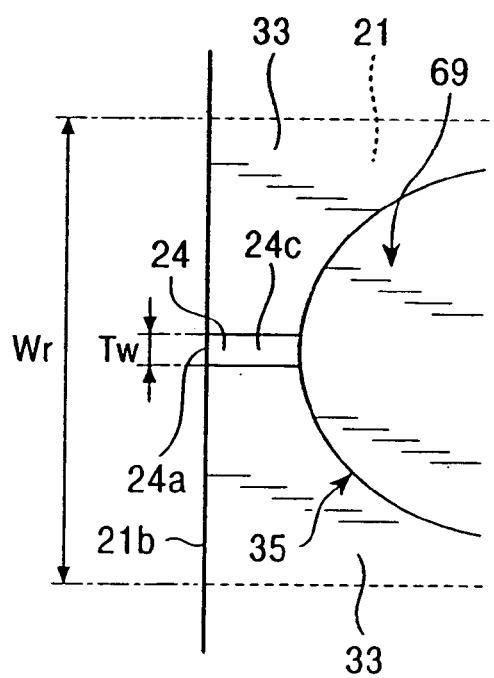
FIG. 18 is a plan view of the perpendicular magnetic recording head shown in FIG. 6.

FIG. 18 is a plan view of the perpendicular magnetic recording head shown in FIG. 6. As shown in FIG. 18, the magnetic material layer 69 is formed such that an upper edge of the front end surface 24a of the main magnetic pole layer 24 has a small width size corresponding to the track width Tw. Then, the front area, denoted by 24c and constituting the main magnetic pole layer 24, is formed to extend from the front end surface 24a rearward in the height direction with a small width that is kept equal to the track width Tw or increases slightly larger than it. Further, the rear area 24d constituting the yoke layer 35 is integrally formed to extend from the base end of the front area 24c rearward in the height direction with a width size gradually increasing in the direction of track width.

The structures of the perpendicular magnetic recording heads according to the embodiments of the present invention, shown in FIGS. 1 to 6, have been described above. The features of the embodiments are summarized as follows.

(1) In any of the embodiments, the main magnetic pole layer 24 is formed on a high-flatness surface. In the embodiments of FIGS. 1, 2, 5 and 6, the main magnetic pole layer 24 is formed on the insulating layer 33, and the upper surface 33a of the insulating layer 33 is high-precisely flattened by polishing utilizing e.g., the CMP technique. Also, in the embodiments of FIGS. 3 and 4, the main magnetic pole layer 24 is formed on the fourth insulating layer 57 and the yoke layer 35, and the upper surfaces of the fourth insulating layer 57 and the yoke layer 35 are high-precisely flattened and leveled to be flush with each other by polishing utilizing, e.g., the CMP technique.

Thus, since the main magnetic pole layer 24 is formed on a high-flatness surface in any of the embodiments of the present invention, it is possible to improve the pattern accuracy in forming the main magnetic pole layer 24, and hence to accurately and easily form the main magnetic pole layer 24, in particular the upper edge of the front end surface 24a thereof, at the small track width Tw. With the present invention, therefore, a perpendicular magnetic recording head can be manufactured which is satisfactorily adaptable for a narrower track and an expected increase of the recording density. Additionally, in the present invention, the track width Tw is preferably not more than 0.7 μm and preferably not more than 0.5 μm.

(2) In any of the embodiments of the present invention, the yoke layer 35 can be formed to have a film thickness larger than that of the main magnetic pole layer 24. In any of the embodiments shown in FIGS. 1 to 5, the main magnetic pole layer 24 and the yoke layer 35 are formed individually. By thus forming the main magnetic pole layer 24 and the yoke layer 35 in separate steps, the main magnetic pole layer 24 having a small film thickness and the yoke layer 35 having a large film thickness can be easily formed, and the yoke layer 35 having a cross-sectional area much larger than the front end surface 24a of the main magnetic pole layer 24 can be formed. It is hence possible to satisfactorily introduce a recording magnetic field from the yoke layer 35 to the main magnetic pole layer 24, to increase the passing efficiency of magnetic flux, and to improve overwrite characteristics.

While the main magnetic pole layer 24 and the yoke layer 35 are formed into an integral structure in the embodiment of FIG. 6, the film thickness of the yoke layer 35 can be made larger than that of the main magnetic pole layer 24 by providing a level difference between the yoke layer 35 and the main magnetic pole layer 24. The manufacturing method in that case will be described later.

(3) In any of the embodiments shown in FIGS. 1 to 5, since the main magnetic pole layer 24 and the yoke layer 35 are formed individually, the width size of the main magnetic pole layer 24, which defines the track width, can be set independently of the width size of the yoke layer 35.

More specifically, if the main magnetic pole layer 24 and the yoke layer 35 are integral with each other like the related art, it is better to form the main magnetic pole layer 24 having the track width Tw in a length as short as possible in the height direction, and to form the yoke layer 35 having a larger width at a position not so far away from the opposing surface H1a in the height direction, from the standpoint of preventing magnetic saturation of the main magnetic pole layer 24 and more efficiently concentrating magnetic flux to the main magnetic pole layer 24 so that a higher recording density may be achieved.

However, if the length of the main magnetic pole layer 24 in the height direction is too short, deterioration of the pattern accuracy would give rise to problems in that a difficulty occurs in defining the width size of the front end surface 24a of the main magnetic pole layer 24 to the predetermined track width Tw, and that variations occur in the track width Tw and the shape of the main magnetic pole layer 24.

In contrast, by forming the main magnetic pole layer 24 and the yoke layer 35 individually like the present invention, the following advantages are obtained. Even when the thin front area 24c having the track width Tw and constituting the main magnetic pole layer 24 is formed relatively long as shown in, e.g., FIGS. 12 and 17, the yoke layer 35 can be formed close to the opposing surface H1a by forming it to lie on or under the front area 24c of the main magnetic pole layer 24. Accordingly, magnetic flux can be efficiently concentrated, and the main magnetic pole layer 24 can be formed to give the predetermined track width Tw with high pattern accuracy. Furthermore, the flexibility in design of the main magnetic pole layer 24 and the yoke layer 35 can be increased.

From the above point of view, in the embodiment of FIG. 1 wherein the yoke layer 35 is formed on the rear area 24d having a gradually increasing width and constituting the main magnetic pole layer 24 as shown in FIG. 10, the front area 24c of the main magnetic pole layer 24 must be formed to have a short length L1. This means that variations are more likely to occur in not only the track width Tw, but also the shape of the main magnetic pole layer 24. In contrast, by filling a space around the main magnetic pole layer 24 with the second insulating layer 56 and then high-precisely flattening and leveling both the upper surfaces of the main magnetic pole layer 24 and the second insulating layer 56 to be flush with each other by the CMP technique, as shown in FIGS. 11 and 12, the yoke layer 35 can be formed to extend over the high-precisely flattened and leveled second insulating layer 56. The yoke layer 35 is therefore permitted to lie on the front area 24c of the main magnetic pole layer 24 as shown in FIG. 12. As a result, the front area 24c of the main magnetic pole layer 24 can be formed to have a relatively large length L2 and the predetermined track width Tw with improved pattern accuracy.

Figure 7:
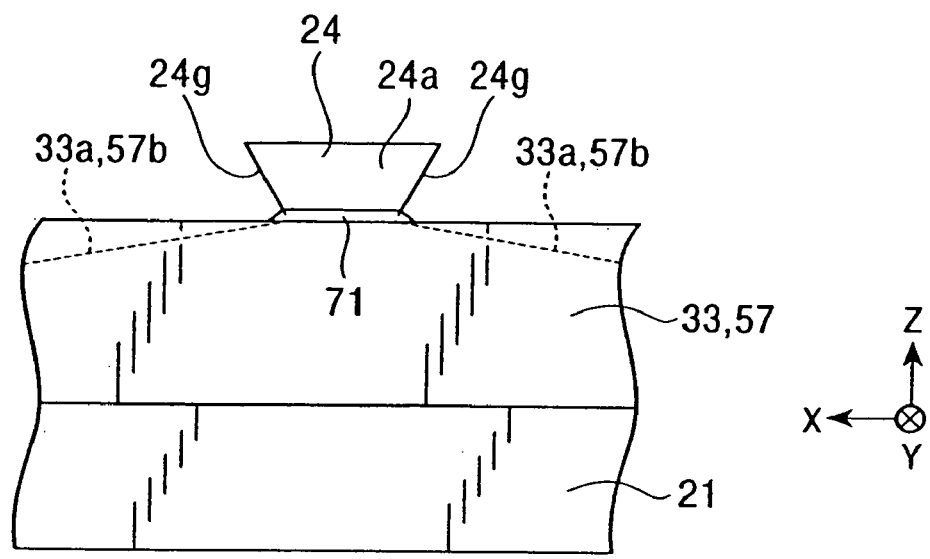
FIG. 7 is a partial front view of the perpendicular magnetic recording head of the present invention.
Figure 8:
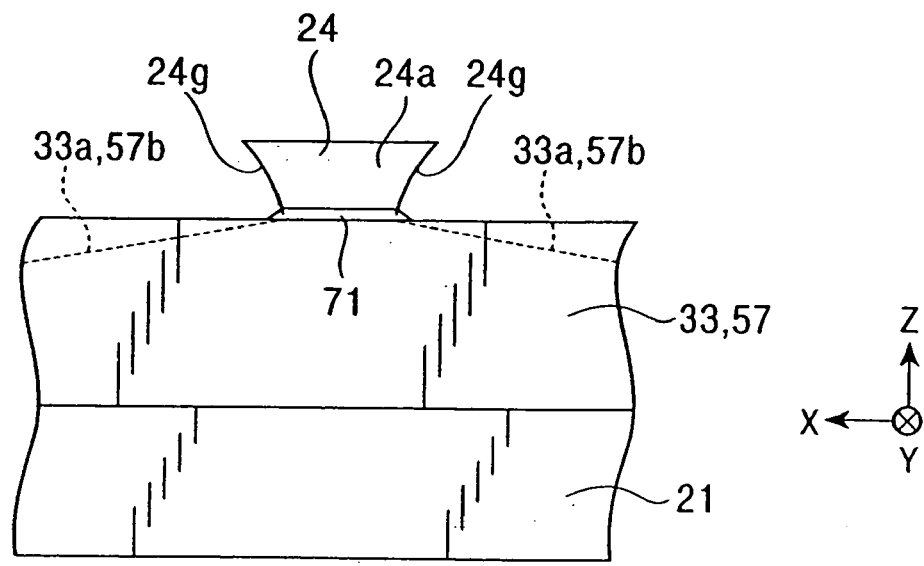
FIG. 8 is another partial front view of the perpendicular magnetic recording head of the present invention.

(4) In any of the embodiments of the present invention, as shown in FIGS. 7 and 8 (front view), opposite lateral sides 24g, 24g of the front end surface 24a of the main magnetic pole layer 24 are formed as sloped or curved edges having a width size gradually increasing in the direction of track width (X-direction in the drawing) as it approaches an upper side from a lower side thereof. Then, the upper edge of the front end surface 24a of the main magnetic pole layer 24 (front edge of the trailing-side surface of the main magnetic pole layer 24) defines the track width Tw.

Figure 9:
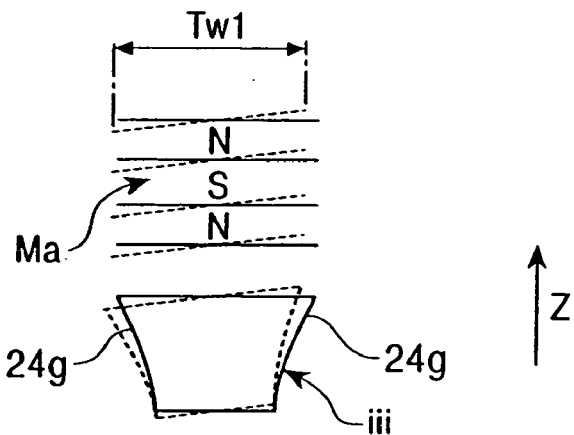
FIG. 9 is an explanatory view showing the condition where the perpendicular magnetic recording head of the present invention is inclined and causes a skew angle.

With such an arrangement that the opposite lateral sides 24g, 24g of the front end surface 24a of the main magnetic pole layer 24 are formed as sloped or curved edges and the front end surface 24a has a shape of a substantially inverted trapezoid, even when a skew angle occurs as shown by broken lines in FIG. 9 when the recording medium is moved in the Z-direction in the drawing for recording, the lateral side 24g, indicated by (iii), is avoided from obliquely and laterally protruding from a recording track width Tw1 to a large extent. It is therefore possible to prevent the occurrence of fringing due to skewing of the lateral side 24g, and to improve off-track characteristics.

Further, as indicated by dotted lines in FIGS. 7 and 8, upper surfaces 33a, 57b of each insulating layer 33, 57 formed on both sides of the lower surface of the main magnetic pole layer 24 are inclined or curved downward as they depart away from the main magnetic pole layer 24. Such a shape is attributable to etching that is carried out to remove an extra plating undercoat layer 71 formed on the upper surfaces 33a, 57b of the insulating layer 33, 57 except for an area under the main magnetic pole layer 24.

(5) In any of the embodiments shown in FIGS. 1 to 5 wherein the main magnetic pole layer 24 and the yoke layer 35 are formed individually, the main magnetic pole layer 24 can be made of a magnetic material having a higher magnetic flux density than that of the yoke layer 35.

Accordingly, high-density magnetic flux $\Phi$ can be perpendicularly applied to the hard surface Ma of the recording medium M from the front end surface 24a of the main magnetic pole layer 24, which has a cross-sectional area in the direction of track width than that of the yoke layer 35, and therefore overwrite characteristics can be improved.

In the perpendicular magnetic recording head H of each embodiment, when a recording current is applied to the coil layer 27 through the lead layer 36, a recording magnetic field is induced in both the auxiliary magnetic pole layer 21 and the yoke layer 35 due to a magnetic field generated by the current flowing through the coil layer 27. At the opposing surface H1a of the head of each embodiment, the recording magnetic field is leaked from the front end surface 24a of the main magnetic pole layer 24 and the front end surface 21b of the auxiliary magnetic pole layer 21. Then, the leaked recording magnetic field penetrates the hard surface Ma of the recording medium M and propagates in the soft surface Mb. Since the front end surface 24a of the main magnetic pole layer 24 has an area much smaller than that of the front end surface 21b of the auxiliary magnetic pole layer 21, the magnetic flux $\Phi$ of the leaked recording magnetic field is concentrated to the front end surface 24a of the main magnetic pole layer 24. A portion of the hard surface Ma opposing to the front end surface 24a is perpendicularly magnetized by the concentrated magnetic flux $\Phi$, whereby magnetic data is recorded.

Figure 19:
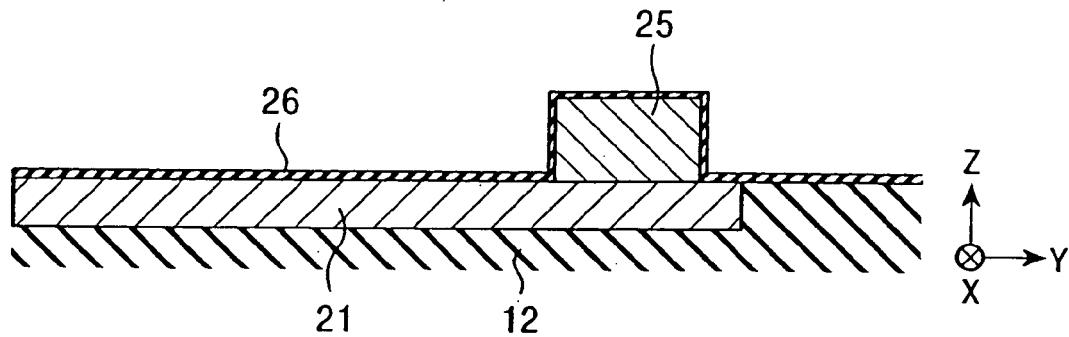
FIG. 19 is a sectional view showing one step of a method of manufacturing the perpendicular magnetic recording head according to the present invention.
Figure 20:
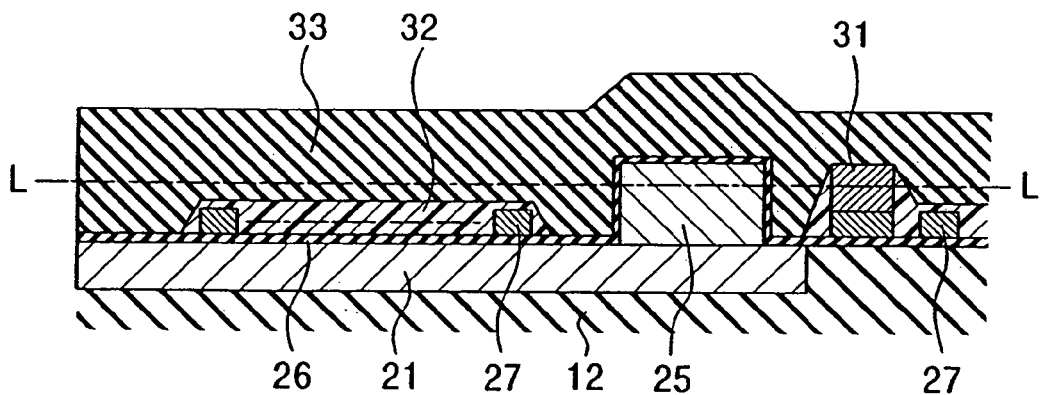
FIG. 20 is a sectional view showing one step carried out subsequent to the step shown in FIG. 19.
Figure 21:
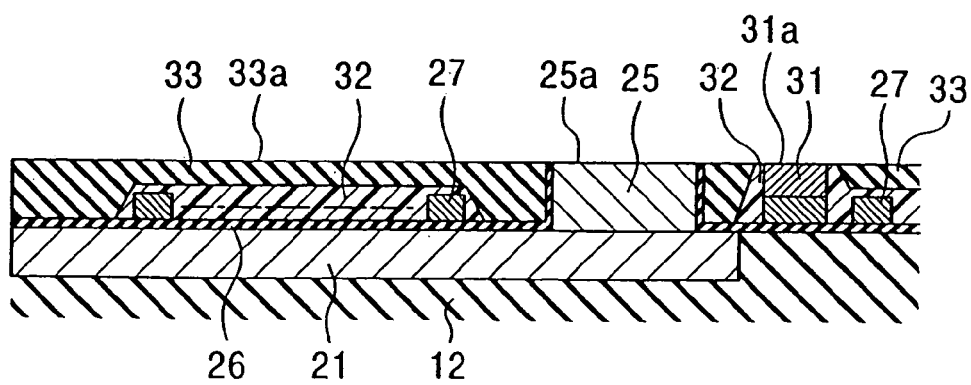
FIG. 21 is a sectional view showing one step carried out subsequent to the step shown in FIG. 20.

The method of manufacturing the perpendicular magnetic recording head of each embodiment will be described below. FIGS. 19 to 21 show manufacturing steps common to all the embodiments. Note that FIGS. 19 to 32 are vertical sectional views of the perpendicular magnetic recording head, showing respective manufacturing steps.

In the step shown in FIG. 19, the auxiliary magnetic pole layer 21 made of magnetic materials is formed to be buried in the nonmagnetic insulating layer 12 such that the auxiliary magnetic pole layer 21 is surrounded by the nonmagnetic insulating layer 12 from behind in the height direction. Then, both the upper surfaces of the auxiliary magnetic pole layer 21 and the nonmagnetic insulating layer 12 are high-precisely flattened and leveled to be flush with each other by, e.g., the CMP technique.

Thereafter, the connecting layer 25 made of magnetic materials is formed by plating in a rear portion of the auxiliary magnetic pole layer 21 in the height direction, and the nonmagnetic insulating layer 26 is formed to extend from the upper surface of the auxiliary magnetic pole layer 21 to the upper surface of the connecting layer 25 by sputtering of inorganic insulating materials.

Subsequently, as shown in FIG. 20, the coil layer 27 is formed on the nonmagnetic insulating layer 26 by frame plating, and the raised layer 31 is also formed by plating. At that time, the coil layer 27 is formed to have an upper surface at a level sufficiently lower than the height of the connecting layer 25. Thereafter, the coil layer 27 and the raised layer 31 are covered by the insulating layer 32 of organic materials, and the insulating layer 33 is formed by sputtering of inorganic insulating materials so as to cover all of the layers.

Then, the thus-formed layers in the condition of FIG. 20 are all polished from above by, e.g., the CMP technique. The polishing is carried out until reaching the position of a horizontal plane (L-L plane) that intersects all of the insulating layer 33, the connecting layer 25 and the raised layer 31.

As a result of the polishing, as shown in FIG. 21, the upper surface 25a of the connecting layer 25, the upper surface 33a of the insulating layer 33, and the upper surface 31a of the raised layer 31 are all processed to lie on the same plane.

The above-described manufacturing steps are common to all the embodiments. The method of manufacturing the perpendicular magnetic recording head having the structure shown in FIG. 1 will be described below.

Figure 22:
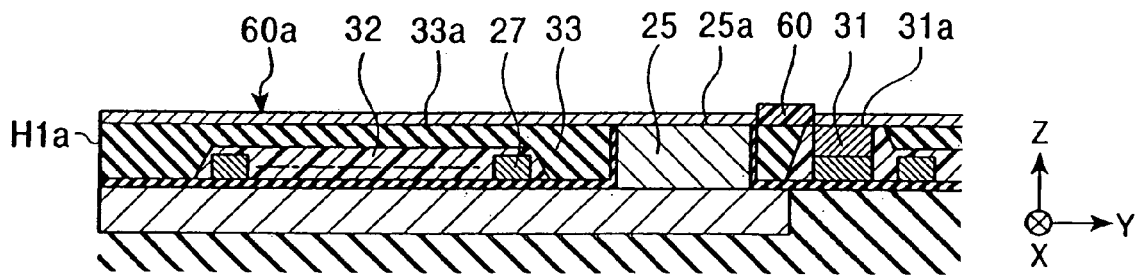
FIG. 22 is a sectional view showing one step of a method of manufacturing the perpendicular magnetic recording head shown in FIG. 1, the step being carried out subsequent to the step shown in FIG. 21.

In the step shown in FIG. 22, a resist layer 60 is first formed all over the upper surface 25a of the connecting layer 25, the upper surface 33a of the insulating layer 33, and the upper surface 31a of the raised layer 31. Then, a holed pattern 60a for the main magnetic pole layer 24 is formed in the resist layer 60 through the exposure and development processes. The holed pattern 60a is formed to extend from the opposing surface H1a, which is positioned opposite to the recording medium, to the upper surface 25a of the connecting layer 25. The holed pattern 60a is also formed to extend rearward from the upper surface 31a of the raised layer 31 in the height direction (Y-direction in the drawing). Subsequently, the main magnetic pole layer 24 is formed in the holed pattern 60a by plating, and thereafter the resist layer 60 is removed. As a result, the main magnetic pole layer 24 extending from the opposing surface H1a to the connecting layer 25 is formed. At that time, since a plating undercoat layer (not shown) necessary for forming the main magnetic pole layer 24 is entirely overlaid on the insulating layer 33, the plating undercoat layer is etched away while leaving a part thereof positioned under the main magnetic pole layer 24. At that time, the main magnetic pole layer 24 is also removed by the etching, and hence the track width Tw defined by the front edge of the upper surface (trailing-side end surface) of the main magnetic pole layer 24 is narrowed. As a result, a perpendicular magnetic recording head adaptable for a narrower track can be manufactured.

Figure 23:
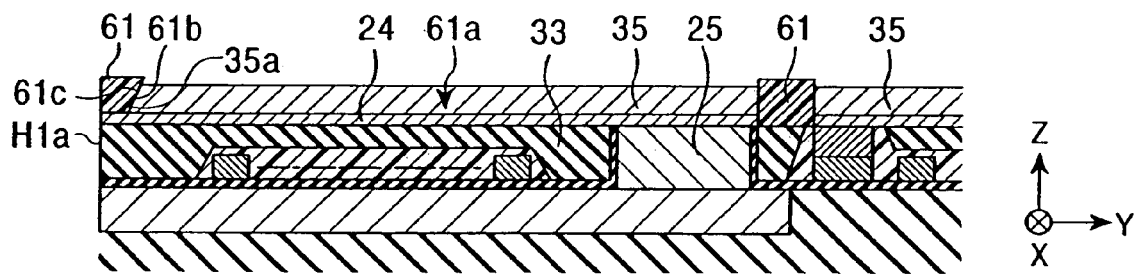
FIG. 23 is a sectional view showing one step carried out subsequent to the step shown in FIG. 22.

Next, in the step shown in FIG. 23, a resist layer 61 is formed all over the main magnetic pole layer 24 and the insulating layer 33. The resist layer 61 has a film thickness larger than that of the main magnetic pole layer 24. Then, a holed pattern 61a for the yoke layer 35 is formed in the resist layer 61 through the exposure and development processes. At that time, a front end surface 61b of the holed pattern 61a is positioned rearward of the opposing surface H1a, which is positioned opposite to the recording medium, in the height direction. Subsequently, the yoke layer 35 is formed in the holed pattern 61a by plating, and thereafter the resist layer 61 is removed. As a result, the yoke layer 35 having a larger film thickness than the main magnetic pole layer 24 is overlaid on the main magnetic pole layer 24.

When the yoke layer 35 is formed only on the main magnetic pole layer 24 as shown in FIG. 10, the plating undercoat layer is not required, and hence the step of removing the plating undercoat layer is no longer needed.

In the structures of FIGS. 11 and 12, after filling a space around the main magnetic pole layer 24 with the second insulating layer 56 of inorganic insulating materials, the upper surface of the main magnetic pole layer 24 and the upper surface of the second insulating layer 56 are high-precisely flattened and leveled to be flush with each other by the CMP technique. Then, as shown in the step of FIG. 23, the yoke layer 35 is formed by plating so as to lie on the main magnetic pole layer 24. At that time, the width size of the yoke layer 35 in the direction of track width may be larger than that of the main magnetic pole layer 24 at the position where it is overlaid on the main magnetic pole layer 24. In such a case, the main magnetic pole layer 24 is not necessarily required to be formed so long as covering the upper surface 25a of the connecting layer 25, as shown in the step of FIG. 22, but it may be formed in a shorter length. Also in such a case, the base end portion 35b of the yoke layer 35 is formed to extend over the upper surface 25a of the connecting layer 25 for magnetic coupling between the base end portion 35b of the yoke layer 35 and the connecting layer 25.

Additionally, as shown in FIG. 23, the resist layer 61 left on the side nearer to the opposing surface H1a than the front end surface 61b of the holed pattern 61a is formed to have a rear end surface 61c that is a sloped or curved surface gradually protruding in the height direction as it approaches an upper surface from a lower surface of the resist layer 61. Such a shape of the rear end surface 61c can be obtained by employing the resist layer 61 of the type that an area subjected to exposure and development is left, while an area not subjected to exposure and development can be removed. By using that type of resist layer, the front end surface 35a of the yoke layer 35 can be formed as a sloped or curved surface that is inclined in the height direction (Y-direction in the drawing) as it approaches the upper surface from the lower surface of the yoke layer 35.

The perpendicular magnetic recording head shown in FIG. 1 is completed through the steps described above.

Figure 24:
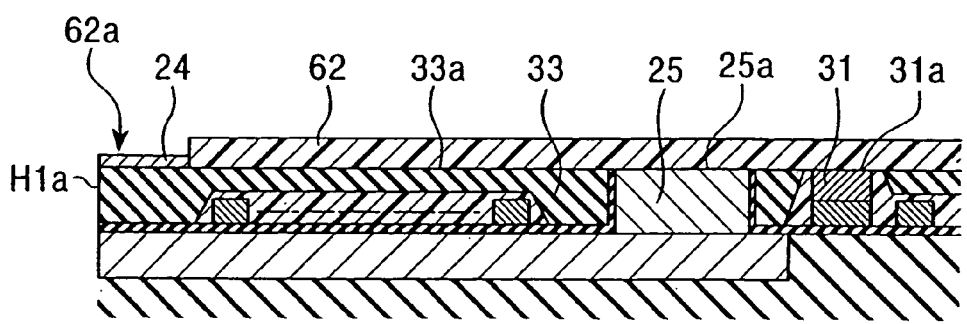
FIG. 24 is a sectional view showing one step of a method of manufacturing the perpendicular magnetic recording head shown in FIG. 2, the step being carried out subsequent to the step shown in FIG. 21.
Figure 25:
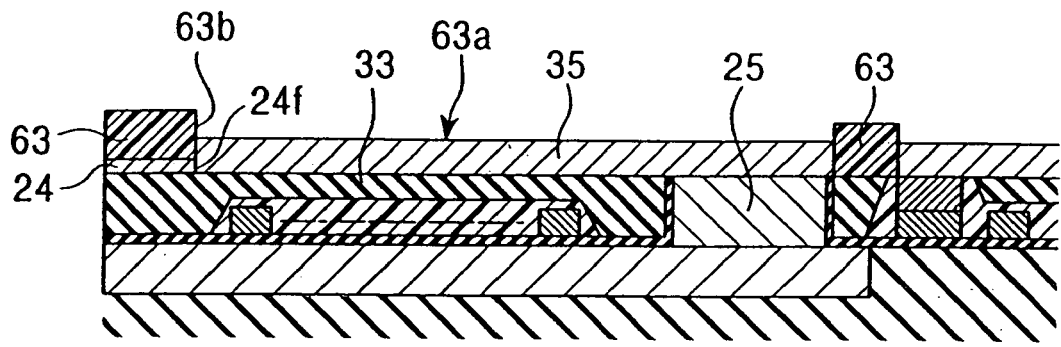
FIG. 25 is a sectional view showing one step carried out subsequent to the step shown in FIG. 24.

FIGS. 24 and 25 show steps of a method of manufacturing the perpendicular magnetic recording head shown in FIG. 2.

In the step shown in FIG. 24, a resist layer 62 is formed all over the upper surface 33a of the insulating layer 33, the upper surface 25a of the connecting layer 25, and the upper surface 31a of the raised layer 31. Then, a holed pattern 62a for the main magnetic pole layer 24 is formed in the resist layer 62 through the exposure and development processes. The holed pattern 62a is formed in a short length to extend rearward from the opposing surface H1a in the height direction (Y-direction in the drawing). Subsequently, the main magnetic pole layer 24 is formed in the holed pattern 62a by plating, and thereafter the resist layer 62 is removed.

Then, in the step shown in FIG. 25, a resist layer 63 is formed all over the main magnetic pole layer 24 and the insulating layer 33, and a holed pattern 63a for the yoke layer 35 is formed in the resist layer 63. At that time, the resist layer 63 is formed to have a film thickness larger than that of the main magnetic pole layer 24. Also, the holed pattern 63a in the resist layer 63 has a front end surface 63b positioned adjacent to the rear end surface 24f of the main magnetic pole layer 24. Further, the holed pattern 63a is formed to extend so as to cover the connecting layer 25. Subsequently, the yoke layer 35 is formed in the holed pattern 63a by plating, and thereafter the resist layer 63 is removed.

As a result, the yoke layer 35 having a larger film thickness than the main magnetic pole layer 24 is formed to extend rearward from the rear end surface 24f of the main magnetic pole layer 24. Also, the yoke layer 35 is magnetically coupled to the upper surface of the connecting layer 25. Since a plating undercoat layer (not shown) is entirely overlaid on the insulating layer 33, the plating undercoat layer is etched away while leaving a part thereof positioned under the main magnetic pole layer 24. At that time, the main magnetic pole layer 24 is also removed by the etching, and hence the track width Tw defined by the main magnetic pole layer 24 is narrowed. As a result, a perpendicular magnetic recording head adaptable for a narrower track can be manufactured.

Further, with the manufacturing method described above, since the step of removing the plating undercoat layer is only required once after the formation of the yoke layer 35, the manufacturing process can be simplified. Thus, since the main magnetic pole layer 24 is subjected to one etching step, a narrower track can be realized while ensuring a sufficient height of the main magnetic pole layer 24.

The perpendicular magnetic recording head shown in FIG. 2 is completed through the steps described above.

Figure 26:
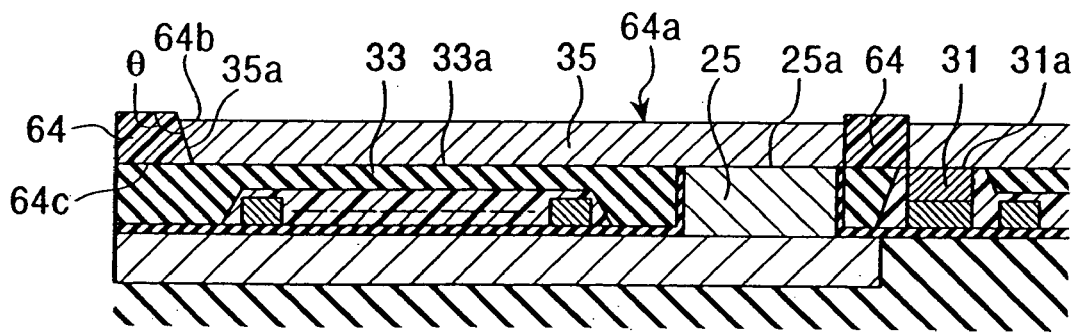
FIG. 26 is a sectional view showing one step of a method of manufacturing the perpendicular magnetic recording head shown in FIG. 3, the step being carried out subsequent to the step shown in FIG. 21.
Figure 27:
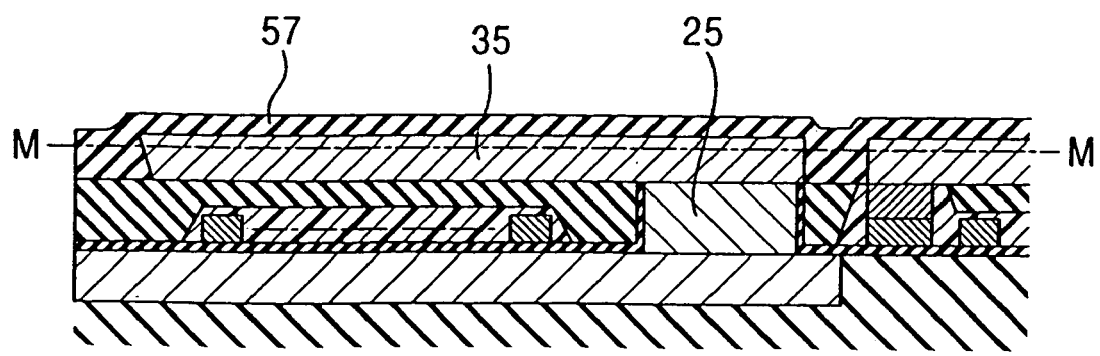
FIG. 27 is a sectional view showing one step carried out subsequent to the step shown in FIG. 26.
Figure 28:
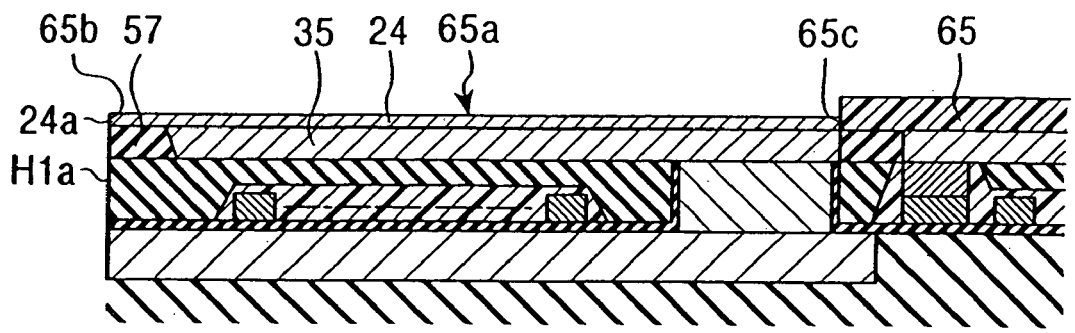
FIG. 28 is a sectional view showing one step carried out subsequent to the step shown in FIG. 27.

FIGS. 26 to 28 show steps of a method of manufacturing the perpendicular magnetic recording head shown in FIG. 3 or 4.

In the step shown in FIG. 26, a resist layer 64 is formed all over the upper surface 33a of the insulating layer 33, the upper surface 25a of the connecting layer 25, and the upper surface 31a of the raised layer 31. Then, a holed pattern 64a for the yoke layer 35 is formed in the resist layer 64 through the exposure and development processes.

As shown in FIG. 26, the holed pattern 64a is formed to have a front end surface 64b positioned inward of the opposing surface H1a in the height direction. Also, the resist layer 64 left between the front end surface 64b and the opposing surface H1a has a rear end surface 64c that is formed as a sloped surface inclined toward the opposing surface H1a as it approaches an upper surface from a lower surface of the resist layer 64. Such a sloped surface can be formed by heat-treating the resist layer 64 so that a sag occurs. Further, the holed pattern 64a is formed to extend so as to cover the connecting layer 25.

Subsequently, the yoke layer 35 is formed in the holed pattern 64a by plating, and thereafter the resist layer 64 is removed. As a result, the yoke layer 35 having a front end surface 35a, which is positioned inward of the opposing surface H1a in the height direction, can be formed. The front end surface 35a is preferably a sloped or curved surface that is inclined rearward in the height direction as it approaches the lower surface from the upper surface of the yoke layer 35. Also, an external angle θ formed between the inclined front end surface 35a and the upper surface of the yoke layer 35 is preferably not less than 90°. Further, the yoke layer 35 is magnetically coupled to the upper surface of the connecting layer 25.

After removing the resist layer 64, a plating undercoat layer (not shown) formed on the insulating layer 33 is etched away except for an area under the yoke layer 35.

Then, in the step shown in FIG. 27, the fourth insulating layer 57 of inorganic insulating materials is formed on the yoke layer 35 and the insulating layer 33. Further, the fourth insulating layer 57 is polished by the CMP technique until reaching an M-M line shown in FIG. 27, whereby the upper surface of the fourth insulating layer 57 and the upper surface of the yoke layer 35 are high-precisely flattened and leveled to be flush with each other.

Then, in the step shown in FIG. 28, a resist layer 65 is formed all over the fourth insulating layer 57 and the yoke layer 35, and a holed pattern 65a for the main magnetic pole layer 24 is formed in the resist layer 65.

As shown in FIG. 28, the resist layer 65 is formed to have a film thickness smaller than that of the yoke layer 35. Also, the holed pattern 65a of the resist layer 65 has a front end surface 65b formed to be flush with the opposing surface H1a. Then, the main magnetic pole layer 24 having a shape shown in FIG. 3 can be obtained by forming a rear end surface 65c of the holed pattern 65a to be positioned flush with the rear end surface of the yoke layer 35 as shown in FIG. 28, and the main magnetic pole layer 24 having a shape shown in FIG. 4 can be obtained by forming the rear end surface 65c of the holed pattern 65a to be positioned nearer to the opposing surface H1a.

Subsequently, the main magnetic pole layer 24 is formed in the holed pattern 65a by plating, and thereafter the resist layer 65 is removed. As a result, the main magnetic pole layer 24, which has the front end surface 24a appearing at the opposing surface H1a and has a smaller film thickness than the yoke layer 35, can be formed so as to lie on the yoke layer 35.

Since a plating undercoat layer (not shown) necessary for forming the main magnetic pole layer 24 is entirely overlaid on the fourth insulating layer 57 and the yoke layer 35, the plating undercoat layer is etched away while leaving a part thereof positioned under the main magnetic pole layer 24. At that time, the main magnetic pole layer 24 is also removed by the etching, and hence the track width Tw defined by the main magnetic pole layer 24 is narrowed. As a result, a perpendicular magnetic recording head adaptable for a narrower track can be manufactured.

The perpendicular magnetic recording head shown in FIG. 3 or 4 is completed through the steps described above.

A method of manufacturing the perpendicular magnetic recording head shown in FIG. 5 will be described below with reference to FIGS. 29 to 32, in which there are shown steps of the manufacturing method.

Figure 29:
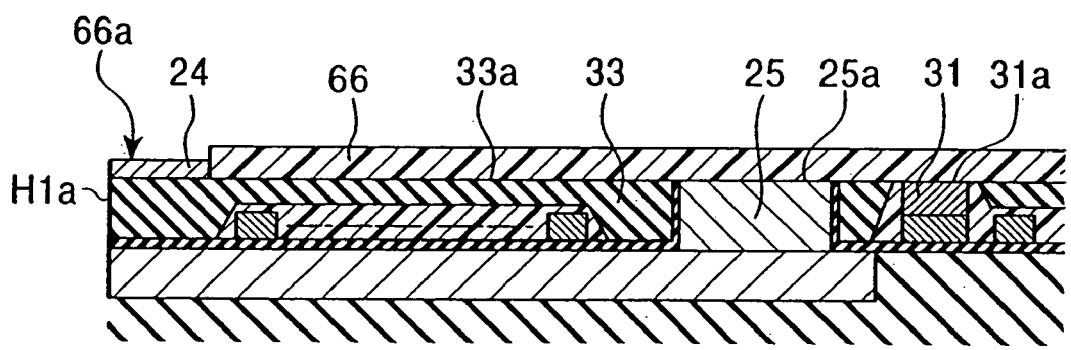
FIG. 29 is a sectional view showing one step of a method of manufacturing the perpendicular magnetic recording head shown in FIG. 5, the step being carried out subsequent to the step shown in FIG. 21.

In the step shown in FIG. 29, a resist layer 66 is formed all over the upper surface 33a of the insulating layer 33, the upper surface 25a of the connecting layer 25, and the upper surface 31a of the raised layer 31. Then, a holed pattern 66a for the main magnetic pole layer 24 is formed in the resist layer 66 through the exposure and development processes. The holed pattern 66a is formed in a short length to extend rearward from the opposing surface H1a in the height direction (Y-direction in the drawing). Subsequently, the main magnetic pole layer 24 is formed in the holed pattern 66a by plating, and thereafter the resist layer 66 is removed. Since a plating undercoat layer (not shown) is entirely overlaid on the insulating layer 33, the plating undercoat layer is etched away while leaving a part thereof positioned under the main magnetic pole layer 24. At that time, the main magnetic pole layer 24 is also removed by the etching, and hence the track width Tw defined by the main magnetic pole layer 24 is narrowed. As a result, a perpendicular magnetic recording head adaptable for a narrower track can be manufactured.

Figure 30:
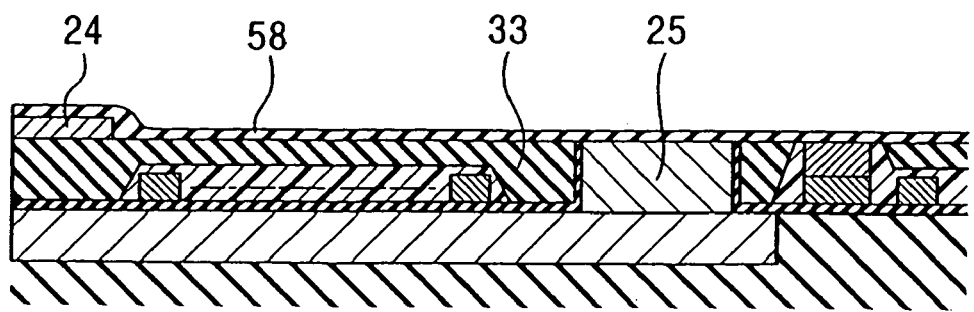
FIG. 30 is a sectional view showing one step carried out subsequent to the step shown in FIG. 29.

Then, in the step shown in FIG. 30, the third insulating layer 58 having a small film thickness and made of inorganic insulating materials, such as $Al_2O_3$ and $SiO_2$, is formed all over the main magnetic pole layer 24 and the insulating layer 33.

Figure 31:
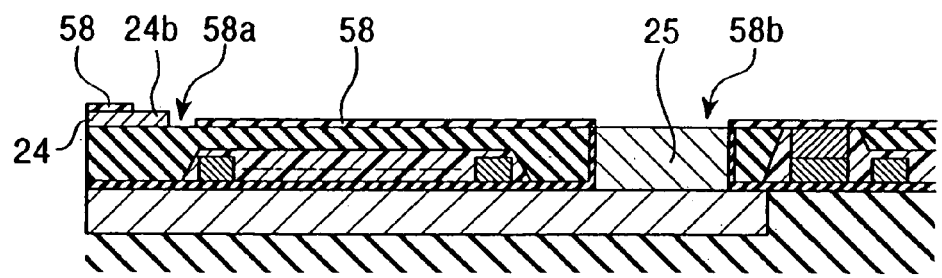
FIG. 31 is a sectional view showing one step carried out subsequent to the step shown in FIG. 30.

Then, in the step shown in FIG. 31, the third insulating layer 58 is partly removed to form holes 58a, 58b by using a resist layer (not shown). One hole 58a is formed to be positioned above the base end portion 24b of the main magnetic pole layer 24, and the other hole 58b is formed to be positioned above the connecting layer 25.

Figure 32:
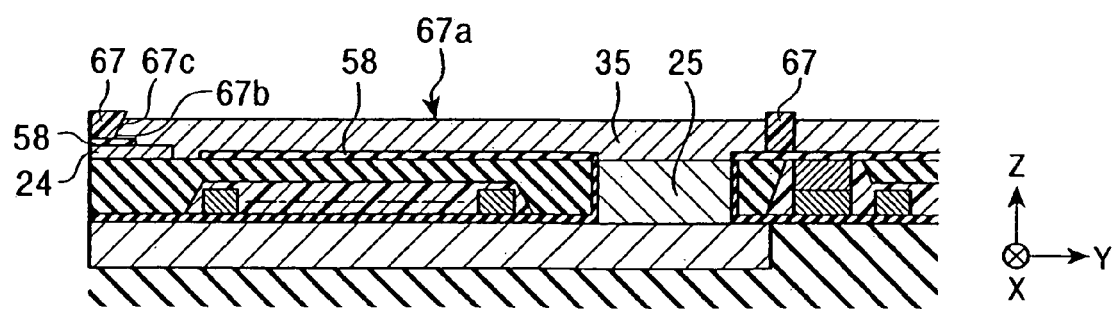
FIG. 32 is a sectional view showing one step carried out subsequent to the step shown in FIG. 31.

Then, in the step shown in FIG. 32, a resist layer 67 having a larger film thickness than the main magnetic pole layer 24 is formed on the third insulating layer 58, and a holed pattern 67a for the yoke layer 35 is formed in the resist layer 67 through the exposure and development processes.

As shown in FIG. 32, the holed pattern 67a has a front end surface 67b positioned inward of the opposing surface H1a in the height direction, and the holed pattern 67a is formed to extend so as to cover the connecting layer 25.

In addition, as shown in FIG. 32, the resist layer 67 left on the side nearer to the opposing surface H1a than the front end surface 67b of the holed pattern 67a is formed to have a rear end surface 67c that is a sloped or curved surface gradually protruding in the height direction as it approaches an upper surface from a lower surface of the resist layer 67. Such a shape of the rear end surface 67c can be obtained by selecting the resist type and employing, as the resist layer 67, a resist of the type that an area subjected to exposure and development is left, while an area not subjected to exposure and development can be removed.

Subsequently, the yoke layer 35 is formed in the holed pattern 67a by plating, and thereafter the resist layer 67 is removed. As a result, the yoke layer 35 can be formed which has the front end surface 35a positioned inward of the opposing surface H1a in the height direction and has a larger film thickness than the main magnetic pole layer 24.

Moreover, as shown in FIG. 32, the yoke layer 35 is magnetically coupled to the base end portion 24b of the main magnetic pole layer 24 and the connecting layer 25. After removing the resist layer 67, a plating undercoat layer (not shown) formed in an area other than that under the yoke layer 35 is etched away. At that time, since the upper surface of the main magnetic pole layer 24 is protected by the third insulating layer 58, the main magnetic pole layer 24 can be avoided from being eroded by the etching.

The perpendicular magnetic recording head shown in FIG. 5 is completed through the steps described above.

A method of manufacturing the perpendicular magnetic recording head shown in FIG. 6 will be described below with reference to FIGS. 33 and 34.

Figure 33:
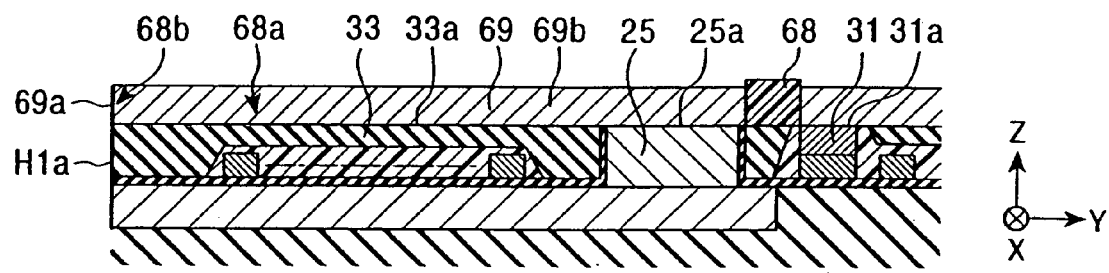
FIG. 33 is a sectional view showing one step of a method of manufacturing the perpendicular magnetic recording head shown in FIG. 6, the step being carried out subsequent to the step shown in FIG. 21.

In the step shown in FIG. 33, a resist layer 68 is formed all over the upper surface 33a of the insulating layer 33, the upper surface 25a of the connecting layer 25, and the upper surface 31a of the raised layer 31. Then, a holed pattern 68a for the magnetic material layer 69 is formed in the resist layer 68 through the exposure and development processes. As shown in FIG. 33, the holed pattern 68a is formed to have a front end surface 68b positioned flush with the opposing surface H1a and to extend so as to cover the connecting layer 25.

Subsequently, the magnetic material layer 69 is formed in the holed pattern 68a by plating, and thereafter the resist layer 68 is removed. Since a plating undercoat layer (not shown) is entirely overlaid on the insulating layer 33, the plating undercoat layer is etched away while leaving a part thereof positioned under the magnetic material layer 69.

In this condition, as shown in FIG. 33, the front end surface 69a of the magnetic material layer 69 appears at the opposing surface H1a, and a base end portion 69b thereof is magnetically coupled to the upper surface of the connecting layer 25.

Figure 34:
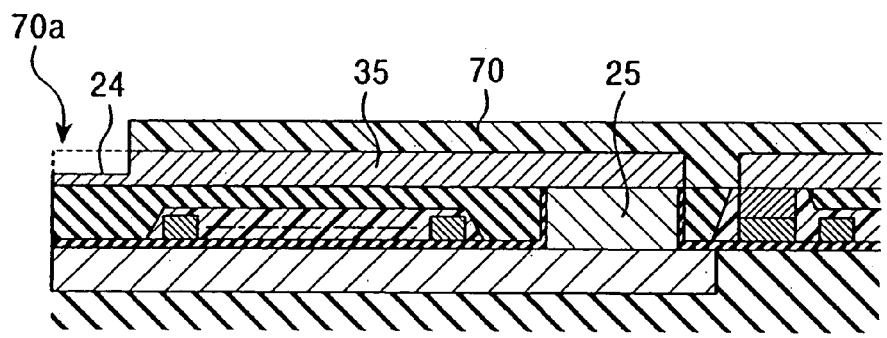
FIG. 34 is a sectional view showing one step carried out subsequent to the step shown in FIG. 33.

Then, in the step shown in FIG. 34, a resist layer 70 is formed on the magnetic material layer 69. A holed pattern 70a for forming the main magnetic pole layer 24 is then formed in the resist layer 70 to position above a front area of the magnetic material layer 69 through the exposure and development processes.

Subsequently, a part of the magnetic material layer 69 exposed through the holed pattern 70a is etched away (as indicated by dotted lines). As a result, a portion of the magnetic material layer 69 left under the holed pattern 70a and having a reduced film thickness serves as the main magnetic pole layer 24, whereas the remaining portion of the magnetic material layer 69 not subjected to the etching and having a larger film thickness serves as the yoke layer 35. The perpendicular magnetic recording head including the main magnetic pole layer 24 and the yoke layer 35 formed into an integral structure, shown in FIG. 6, is thus completed. In this manufacturing method, since the plating undercoat layer formed in the area other than that under the magnetic material layer 69 is etched away beforehand after forming the magnetic material layer 69 having a large film thickness, the manufacturing process can be simplified in, for example, that the third insulating layer 58 is no longer required which is formed in the manufacturing process, shown in FIGS. 29 to 32, to protect the main magnetic pole layer 24 against erosion by the etching carried out to form the yoke layer 35.

With any of the manufacturing methods described above, since the main magnetic pole layer 24 is formed on a high-flatness surface, the main magnetic pole layer 24 can be formed with high pattern accuracy. Also, since the width size of the main magnetic pole layer 24 corresponding to the track width Tw is reduced as a result of the etching carried out to remove the plating undercoat layer, a perpendicular magnetic recording can be manufactured which is adaptable for an expected increase of recording density and a narrower track.

Further, with the manufacturing processes shown in FIGS. 22 to 32, since the main magnetic pole layer 24 and the yoke layer 35 are formed in separate steps, the yoke layer 35 can be easily formed to have a larger film thickness than the main magnetic pole layer 24 by setting the film thickness of the yoke layer 35 when it is formed, to be larger than the film thickness of the main magnetic pole layer 24 when it is formed. Even when the main magnetic pole layer 24 and the yoke layer 35 are formed into an integral structure as shown in FIGS. 33 and 34, it is also possible to form those two layers such that the yoke layer 35 has a larger film thickness than the main magnetic pole layer 24, by employing the manufacturing method of the present invention.

In addition, since the main magnetic pole layer 24 and the yoke layer 35 are formed in separate steps, the width size of the main magnetic pole layer 24 corresponding to the track width Tw can be set separately from the setting of the width size of the yoke layer 35. Particularly, in the structure wherein the main magnetic pole layer 24 and the yoke layer 35 are laid one above the other as shown in FIGS. 1, 3 and 4, the yoke layer 35 can be formed in any desired position close to the opposing surface H1a, and therefore the main magnetic pole layer 24 can be formed to provide the predetermined track width Tw without variations in shape of the main magnetic pole layer 24.

Figure 35:
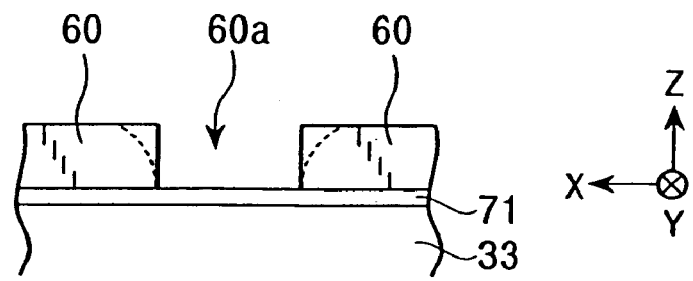
FIG. 35 is a schematic front view showing one step of a method of forming a front end surface of a main magnetic pole layer.
Figure 36:
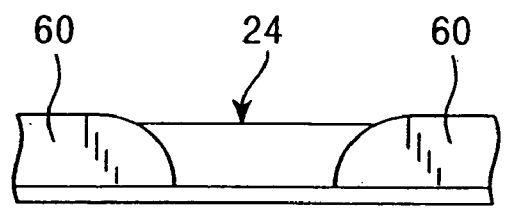
FIG. 36 is a schematic front view showing one step carried out subsequent to the step shown in FIG. 35.
Figure 37:
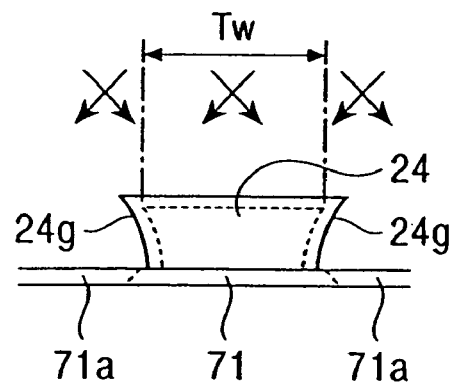
FIG. 37 is a schematic front view showing one step carried out subsequent to the step shown in FIG. 36.
Figure 38:
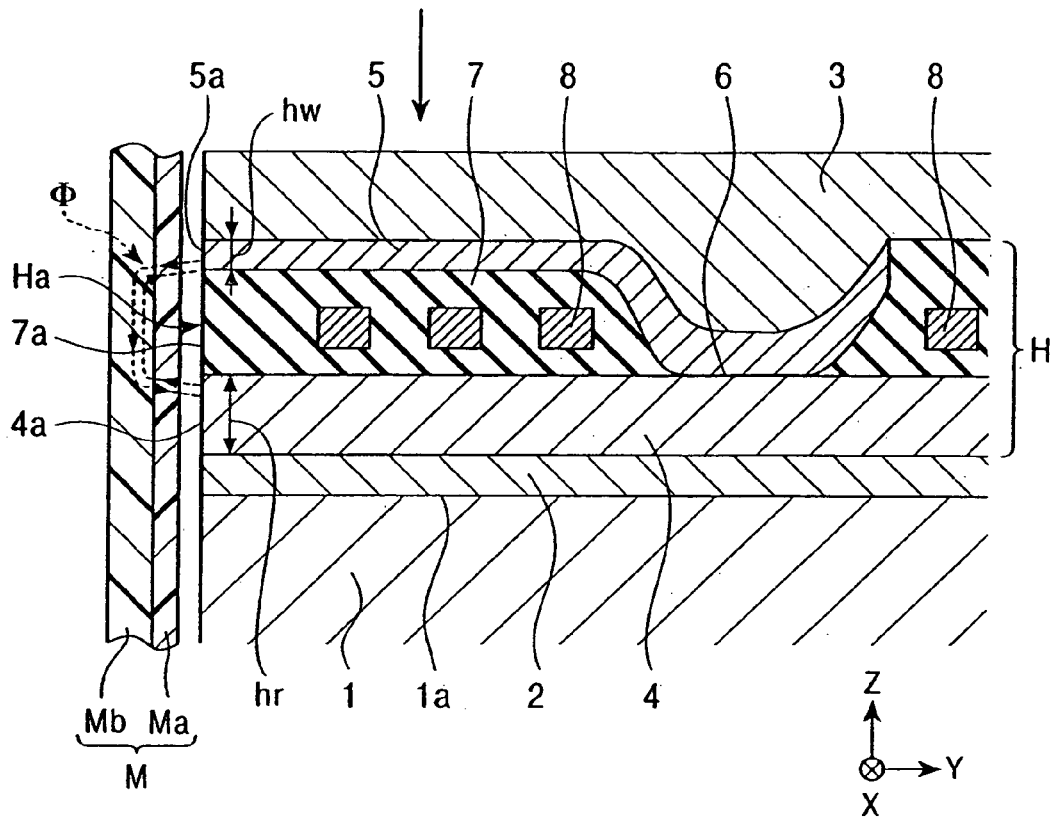
FIG. 38 is a vertical sectional view showing a structure of a conventional perpendicular magnetic recording head.
Figure 39:
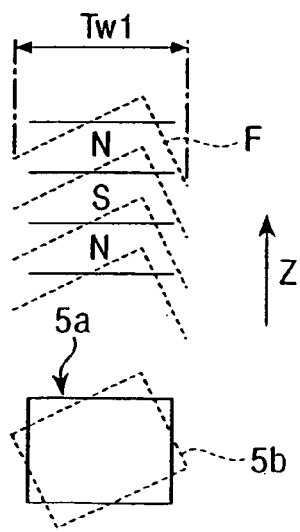
FIG. 39 is an explanatory view showing the condition where the conventional perpendicular magnetic recording head is inclined and causes a skew angle.

While the methods of manufacturing the perpendicular magnetic recording heads shown in FIGS. 1 to 6 have been described above, the method of manufacturing the front end surface 24a of the main magnetic pole layer 24 in the present invention will be described below. FIGS. 35 to 37 are front views for explaining the method. The following description is made, by way of example, in connection with the step (FIG. 22) of manufacturing the perpendicular magnetic recording head of FIG. 1, but it is equally applied to the step of manufacturing each of the perpendicular magnetic recording heads of FIGS. 2 to 6.

FIG. 35 is a schematic partial front view of the perpendicular magnetic recording head in the manufacturing step shown in FIG. 22. In the step shown in FIG. 22, a plating undercoat layer 71 for forming the main magnetic pole layer 24 is formed, and the resist layer 60 is formed thereon.

Then, the holed pattern 60a for forming the main magnetic pole layer 24 is formed in the resist layer 60 through the exposure and development processes. After that, heat treatment is carried out so that a sag occurs at an inner end surface of the resist layer 60 (as indicated by dotted lines). As a result, the inner end surface defining the holed pattern 60a is formed as a sloped or curved surface having a width size that gradually increases in the direction of track width (X-direction in the drawing) as it approaches the upper surface to the lower surface of the resist layer 60.

Then, as shown in the step of FIG. 36, the main magnetic pole layer 24 is formed in the holed pattern 60a by plating, and thereafter the resist layer 60 is removed. FIG. 37 shows a condition after removing the resist layer 60. As shown in FIG. 37, opposite lateral sides 24g, 24g of the main magnetic pole layer 24 in the direction of track width are formed as sloped or curved surfaces having a spacing therebetween, which gradually increases as it approaches the upper surface from the lower surface of the main magnetic pole layer 24.

Subsequently, the plating undercoat layer 71 formed in an area other than that under the main magnetic pole layer 24 is removed by anisotropic etching. The etching angle is set to be preferably not smaller than 45°, more preferably about 70°, with respect to the vertical direction. Through the etching, a useless plating undercoat layer 71a is removed. The main magnetic pole layer 24 is also partly eroded by the etching.

As shown in FIG. 37, since the opposite lateral sides 24g, 24g of the main magnetic pole layer 24 are etched, the track width Tw, which is defined by the width size of the upper surface of the main magnetic pole layer 24, is reduced (as indicated by dotted lines) and hence a perpendicular magnetic recording head adaptable for a narrower track can be manufactured.

Additionally, when a nonmagnetic metallic material, e.g., Cu, is used as the plating undercoat layer 71, the plating undercoat layer 71 may be left in a condition slightly protruding below and around the main magnetic pole layer 24. Therefore, etching control can be simplified in comparison with the case of using a magnetic metallic material as the plating undercoat layer 71.

As an alternative method, the main magnetic pole layer 24 can also be formed without using the resist layer 60 shown in FIGS. 35 and 36. According to this method, after forming the plating undercoat layer 71 of a nonmagnetic metallic material, a layer of an inorganic insulating material is formed on the plating undercoat layer 71. Then, a resist layer having a predetermined slit is formed on the layer of the inorganic insulating material, and the layer of the inorganic insulating material exposed through the slit is removed by etching. A space thus etched away is defined by opposite end surfaces spaced in the direction of track and has a shape having a width that gradually increases as it approaches an upper surface from a lower surface of the resist layer. The main magnetic pole layer 24 is then formed in the space by plating. As a result, the main magnetic pole layer 24 having the opposite lateral sides 24g, 24g in the direction of track width can be formed, both the sides being formed as sloped or curved surfaces with a width therebetween gradually increasing as it approaches the upper surface from the lower surface of the main magnetic pole layer 24.

In the present invention, it is just essential that the resist layer 60 be formed to have, at least at the opposing surface H1a, an inner width size in the direction of track width, which gradually increases as it departs farther away from the auxiliary magnetic pole layer 21. In other words, the sloped surfaces shown in FIG. 36 may not be formed at opposite inner end surfaces of the holed pattern in an area rearward of the opposing surface H1a in the height direction.

While the reading portion $H_R$ is formed in each of the embodiments shown in FIGS. 1 to 6, it may be dispensed with.

According to the present invention, as described above, since the main magnetic pole layer is formed on a surface flattened into high flatness, it is possible to improve the pattern accuracy in forming the main magnetic pole layer, and hence to accurately and easily form the main magnetic pole layer, in particular the upper edge of the front end surface thereof, with the small track width Tw. With the present invention, therefore, a perpendicular magnetic recording head can be manufactured which is satisfactorily adaptable for a narrower track and an expected increase of the recording density.

Also, according to the present invention, the yoke layer can be formed to have a film thickness larger than that of the main magnetic pole layer, and the yoke layer having a cross-sectional area much larger than the area of the front end surface of the main magnetic pole layer can be formed. It is hence possible to effectively introduce a recording magnetic field from the yoke layer to the main magnetic pole layer, to increase the passing efficiency of magnetic flux, and to improve overwrite characteristics.

Further, the main magnetic pole layer and the yoke layer are formed individually and the yoke layer is formed to lie on or under the main magnetic pole layer. Therefore, even when an area of the main magnetic pole layer having a small width corresponding to the track width Tw is formed relatively long, the yoke layer can be formed in any desired position close to the opposing surface of the head positioned opposite to the recording medium. Accordingly, magnetic flux can be efficiently concentrated, and the main magnetic pole layer can be formed to give the predetermined track width Tw with high pattern accuracy.

Furthermore, according to the present invention, the opposite lateral sides of the front end surface of the main magnetic pole layer are formed as sloped or curved edges having a width therebetween in the direction of track width, which gradually increases as it approaches the upper surface from the lower surface of the main magnetic pole layer. Therefore, even when a skew angle occurs in recording, it is possible to prevent the occurrence of fringing and to improve off-track characteristics.

What is claimed is:

1. A method of manufacturing a perpendicular magnetic recording head, comprising the steps of:

forming a resist layer on an insulating layer, forming a holed pattern for a yoke layer in said resist layer, said holed pattern having a front end surface positioned inward of an opposing surface of the head opposite to a recording medium, forming said yoke layer in said holed pattern by plating, and then removing said resist layer;

forming other insulating layer to lie on said yoke layer and said insulating layer, polishing said other insulating layer such that an upper surface of said other insulating layer and an upper surface of said yoke layer are flattened flush with each other;

forming a resist layer having a smaller film thickness than said yoke layer to lie on said yoke layer and said other insulating layer, forming a holed pattern for a main magnetic pole layer to extend from an area of said resist layer on said other insulating layer, which is positioned on the side nearer to said opposing surface than a front end surface of said yoke layer, to an area of said resist layer on said yoke layer; and forming said main magnetic pole layer in said holed pattern by plating, and then removing said resist layer.

* * * * *